United States Patent [19]
Daleiden et al.

[11] Patent Number: 5,154,211
[45] Date of Patent: Oct. 13, 1992

[54] APPARATUS AND METHOD FOR FILLING BAKERY DOUGH INTO CAVITY PANS

[75] Inventors: George R. Daleiden; Billy D. Haffner, both of Kalamazoo, Mich.

[73] Assignee: Monica Gourmet Foods, Inc., Kalamazoo, Mich.

[21] Appl. No.: 632,947

[22] Filed: Dec. 24, 1990

[51] Int. Cl.$^5$ .................. B65B 37/08; B29C 31/02; B28B 13/00; A21C 9/08

[52] U.S. Cl. .................................. 141/131; 141/1; 141/12; 141/73; 141/163; 141/280

[58] Field of Search ................ 141/1, 12, 71, 73, 80, 141/131, 163, 280; 425/220; 426/496

[56] References Cited

U.S. PATENT DOCUMENTS

| | | | |
|---|---|---|---|
| 1,366,226 | 1/1921 | Welsh | 425/134 |
| 1,669,526 | 5/1928 | Lauhoff | 141/131 |
| 1,961,566 | 6/1934 | Mason | 426/503 |
| 2,045,228 | 6/1936 | Harber et al. | 426/496 X |
| 3,787,597 | 1/1974 | Dryg et al. | 426/496 |
| 4,147,809 | 4/1979 | Thompson | 426/499 |
| 4,153,084 | 5/1979 | Payne | 141/80 |
| 4,281,025 | 7/1981 | Longnecker | 426/496 |
| 4,592,916 | 6/1986 | Akesson | 426/517 |
| 4,750,413 | 6/1988 | Voegtlin | 426/496 X |
| 4,878,522 | 11/1989 | Ostrander | 141/1.1 |
| 4,932,443 | 6/1990 | Karolek et al. | 141/1.1 |

FOREIGN PATENT DOCUMENTS 0100258 1/1962 Netherlands ............... 425/220

Primary Examiner—William A. Cuchlinski, Jr.
Assistant Examiner—W. Morris Worth
Attorney, Agent, or Firm—Gordon W. Hueschen

[57] ABSTRACT

A method and apparatus for filling bakery dough, especially thick, sticky bakery dough, into cavity pans is disclosed. The bakery dough is fed from a source into a housing into which cavity pans are advanced by a conveyor. The cavity pans proceed beneath counter-rotating dough-feeding rollers and advance to a rotating compaction roller which rests under downward spring bias on the upper surface of the cavity pan and which rotates to force the dough into the cavities. The dough in the thus-filled cavities is levelled off and excess removed by a doctor blade or roll to which the pan is then advanced, the doctor blade or roll also being under downward spring-bias to maintain it in contact with the upper surface of the cavity pan being filled. A removable barrier plate at the exit end of the housing cooperates in close-fitting relationship with the doctor blade or roll to prevent dough from seeping out the forward end of the apparatus, and the housing and side retainer rails act to prevent the dough from oozing out sideways. Upon emergence from the housing at a trimming point, at which point the level of the dough in the cavities has been finalized and excess removed by the doctor blade or roll, the filled cavity pans are in condition for advancement to an oven for baking of the dough in the cavities. The apparatus and method are particularly suitable for employment with thick, sticky dough such as frequently employed in the production of cookies, bon-bons, "butterballs", and the like.

87 Claims, 6 Drawing Sheets

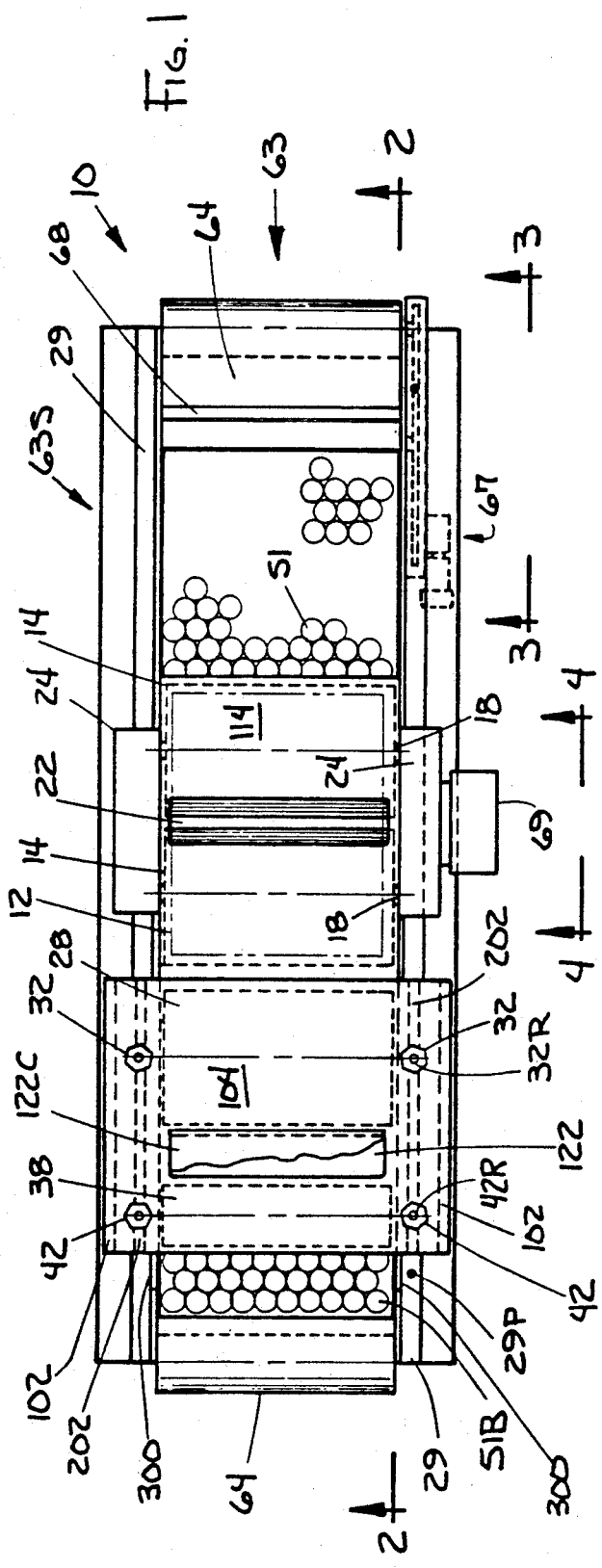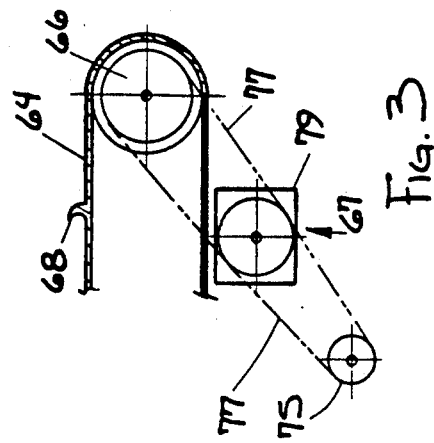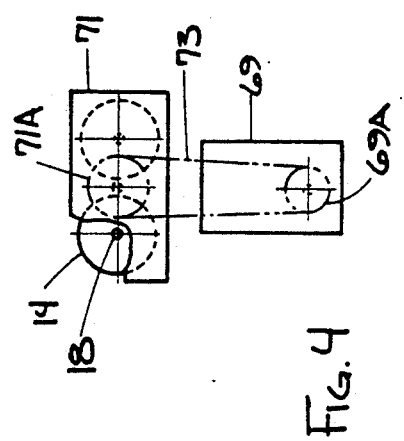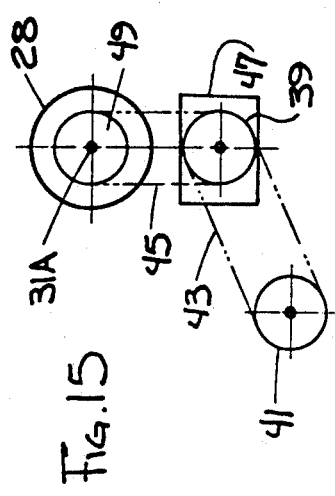

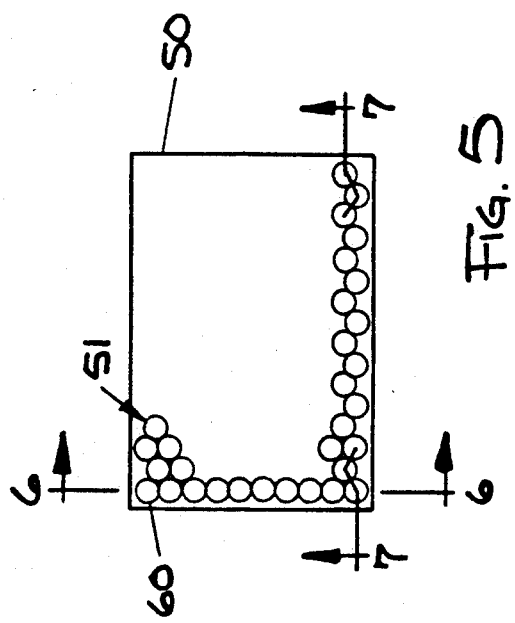
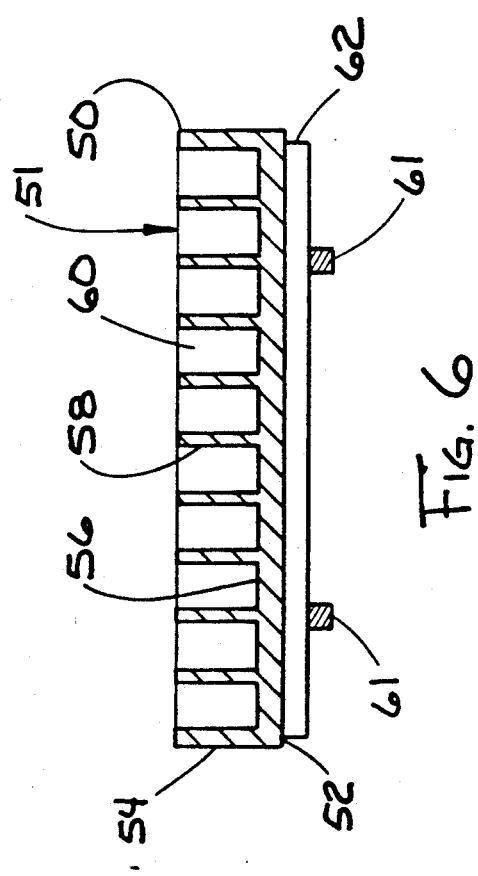
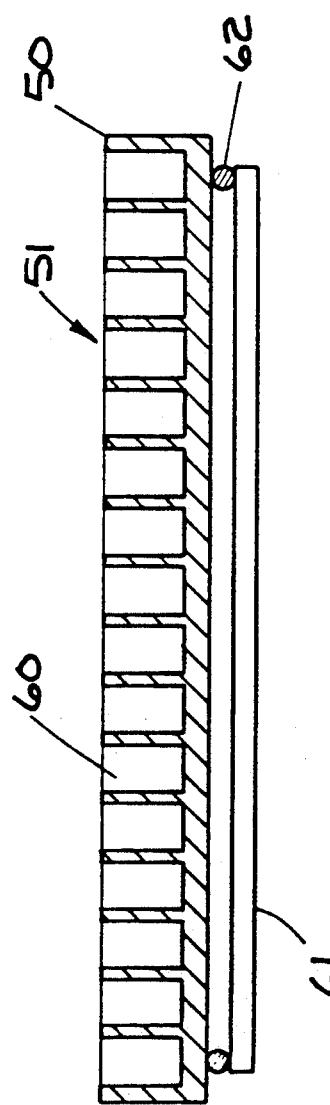

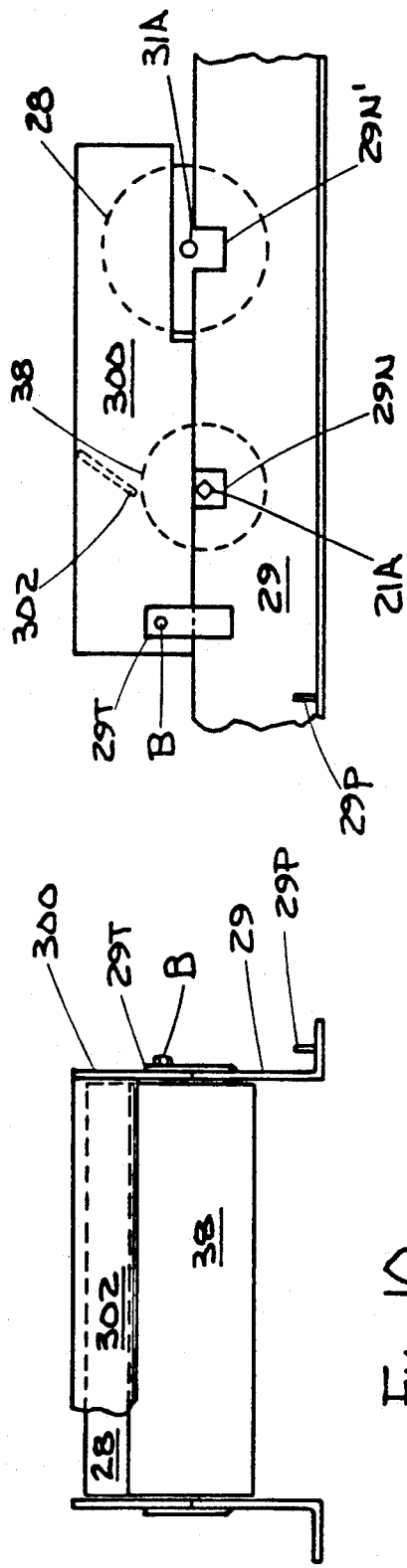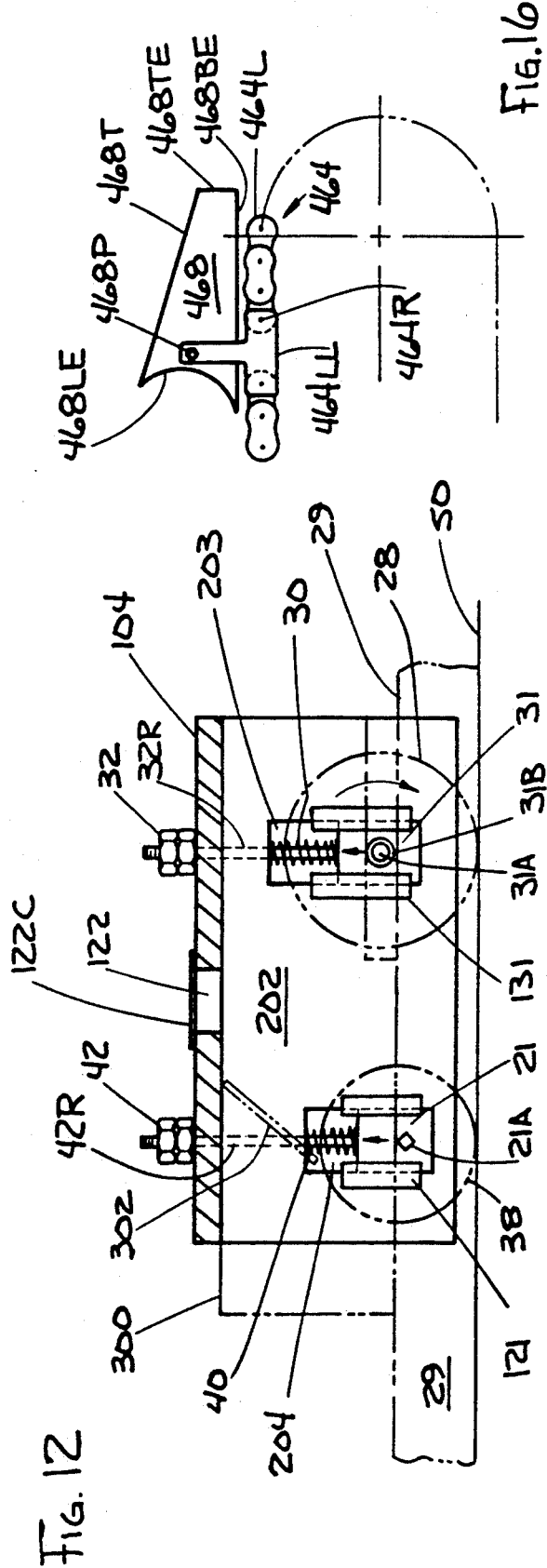

APPARATUS AND METHOD FOR FILLING BAKERY DOUGH INTO CAVITY PANS

BACKGROUND OF THE INVENTION AND PRIOR ART

1. Field of Invention

Apparatus and method for the filling of cavity pans with bakery dough for the production of cookies, bon-bons, "butter-balls", or the like.

2. Prior Art

Conventional cookies, bon-bons, "butter-balls", or the like, have previously been made by using conventional cookie machines of the following types:

Extruders which force dough through an array of orifices in an on-off fashion, which work well with thinner and batter-like doughs.

Extruder-wire cutters which force thicker doughs through orifices whereafter a thin wire cuts the extruded dough into pieces. The resultant pieces may obviously have many shapes and thicknesses and these devices are sometimes referred to as a "wire cut depositor".

Rotary cutters which are in fact rotary cookie cutters and widely used in the industry for production of Oreo ™ cookies, butter cookies, and a host of others. Such rotary-molded cookies rarely exceed ¼ inch in thickness for obvious technological reasons.

Butter-ball cookies and like cookies cannot be made on any of the foregoing machines, because the dough involved is simply too "short", thick, and/or non-cohesive for their use. One obvious shortcoming of the existing machines is that they do not pack dough but only form it, whereas cookies and the like made from thicker, tougher, more viscous dough must be packed tightly and not simply formed. Of all the machines available, one called a Morrow "Cut-Roll ™" will extrude and cut a piece of menstruum and then roll it into a ball. Marzipan balls are sometimes made in this manner and by such a machine. The device is understood to have become obsolete and it works in an entirely different manner and on an entirely different principle than employed according to the present invention and would not in any event effect the objectives thereof.

In addition, various yeast-raised dough-forming devices are available for making bagels, rolls, breadsticks, and the like, but none of these can form "butterball" dough or the like, because such dough is too thick and/or non-cohesive to itself whereas it generally sticks to everything else.

The concept of "pumping" or otherwise driving dough into a cavity, which we here refer to as "injection/compaction", "compaction", or "forcing", is not a new concept. Molded cast iron pans have been available at least since the beginning of the century, and previous practice generally involved manually pressing of dough into cast iron pans and then placing the pans into the oven.

According to our own previous experience in the production of baked goods, e.g. cookies, bon-bons, or "butter-balls", our own best efforts in the production of such products by baking in a cavity pan or employing a cavity pan prior to baking, involved numerous independent and difficultly-effected steps, all conducted by hand.

A search carried out at the U.S. Patent Office in Class 99, Subclass 353; Class 426, Subclasses 496 and 503; and Class 425, Subclass 17, failed to turn up anything remotely like the method or apparatus of the present invention. The state of the art of handling dough was generally disclosed in Harber, U.S. Pat. No. 2,045,228 and Dryg U.S. Pat. No. 3,787,597. Mason U.S. Pat. No. 1,961,566 discloses a forming/dividing device including a ribbed, curved pressure board; Akesson U.S. Pat. No. 4,592,916 discloses an apparatus in which a piston compresses dough on a belt; Longenecker U.S. Pat. No. 4,281,025 and Voegtlin U.S. Pat. No. 4,750,413 disclose apparatus in which a movable dough-flattening means is provided; and Thompson U.S. Pat. No. 4,147,809 discloses a dough-urging and dough-flattening means in an apparatus for forming dough. Nothing more relevant to the present invention was found in the search. Nor was anything of relevance found in a search through the 394 pages of the book "Cookie and Cracker Technology", Second Edition, by Matz and Matz, published by AVI Publishing Company, Inc., Westport, Connecticut, USA.

The present invention involves the new and unobvious concept of employing a spinning wheel (herein referred to as an "injection/compaction" or "forcing" or just "compaction" roller or drum), which is generally of stainless steel, as a "rolling pin", which in principle creates a hydraulic pressure with the dough being filled into the cavity pans comprising the hydraulic medium, i.e., the dough. This has been found to create sufficient pumping action to effect the injection/compaction necessary to effect the objectives of the present invention. The forces, which are at work during the process and which are provided by the apparatus of the present invention, are relatively large and the favorable result we have obtained was not at all predictable.

The doughs involved generally are "short", dense, thick, sticky, turgid, discontinuous, non-cohesive, and non-flowing and, unlike most doughs, they contain little or no added liquid to render them workable or machinable. They may be, for example, basically a shortbread dough comprising nut particles. They have historically been made by forming into balls by hand rolling and, subsequently and by us, by manually pressing the dough into cavities of a cavity pan and then baking in the pan. The dough employed in making such pastries as butter-balls or the like is so tough that it takes great effort to place it into any shape at all and, accordingly, it must be packed, manually or mechanically, for the final confectionery or cookie to stay together in the manner which, we have found, could be effected previously only by hand rolling, after which we proceeded to develop our own novel cavity pan approach.

There has, accordingly, been a long-felt need in the art for a better method and apparatus for the production of confectionery of the type previously described, especially involving extremely tough or dense or viscous or thick and sticky dough of the type previously described, and the present invention provides both such advantageous method and apparatus for effecting this highly-desirable result.

OBJECTS OF THE INVENTION

It is accordingly an objection of the present invention to provide a novel apparatus and method for filling bakery dough into cavity pans. A further object is the provision of such method and apparatus which is far superior to any previously known in the art. An additional object of the invention is to provide such a method and apparatus which is far superior to any previously known to or discovered by us. A still further object of the invention is to provide such a method whereby the bakery dough can be metered into cavity pans, injected/compacted therein, and subjected to a leveling procedure employing leveling means in the form of a doctor roller or blade, all without manual intervention. Still a further object of the invention is to provide such a method and apparatus in which the cavity pans can be advanced automatically by means of a conveyor system beneath a dough-metering assembly and then injected/compacted into the cavities of the cavity pan by means of a rotating and relatively heavy roller, and whereby the excess dough can be cleanly and efficiently trimmed from the cavity pan by leveling and trimming means in the form of a doctor roll or blade. Still an additional object of the invention is the provision of such a method and apparatus involving a conveyor assembly, a dough-metering assembly, a compaction/injection assembly, and a dough-leveling and trimming assembly, all of which cooperate effectively together, advantageously automatically, to provide a combination of elements or assemblies and steps which permits the attainment of unprecedented results in the baking art. Yet other objects are to provide means for the swift mass production of cookies, crackers, biscuits and other bakery products, by the compression/compaction of dough into molds, employing the apparatus and method herein described, to yield discrete dough pieces of any thickness, dimension, shape, or weight amenable to baking, and of any shape releasable from a mold, and of consistent volume, thickness, shape and weight such that the great majority of said dough pieces, whether baked or unbaked, will vary not more than about 5% from one another in their individual weights and volumes, when said dough pieces are so compressed/compacted into molds from a uniform batch of mixed dough, within a reasonable period of time, employing the apparatus and method of the invention herein described. Still other objects will be apparent to one skilled in the art, and yet additional objects will become apparent as the description of the invention proceeds.

SUMMARY OF THE INVENTION

Our invention then, in summary, comprises the following aspects, inter alia, alone or in combination:

Apparatus for filling bakery dough into a cavity pan, which is a pan having upper and lower surfaces and side edges, with cavities formed in the upper surface thereof for containment of bakery dough in said cavities, in preparation for baking of the same, comprising the following elements in combination:
1) conveyor means for conveying said cavity pan;
2) dough-feeding means for feeding dough to said cavity pan;
3) rotatable compaction means for forcing said dough into the cavities of said cavity pan;
4) doctor means for finalizing the level of said dough in said cavities and removing excess dough from said pan;
5) the direction of conveyance of said cavity pan being from said dough-feeding means to said compaction means to said doctor means;
6) and means for driving said conveyor means, said dough-feeding means, and said compaction means; such an apparatus comprising also dough-storage means associated with said feeding means for storage of said dough just prior to entry into said feeding means; such an apparatus wherein said dough-storage means is a dough hopper; such an apparatus wherein said dough-feeding means is a rotatable feeding means; such an apparatus wherein said dough-feeding means is a double-drum feeding means, the drums of which rotate in opposite directions toward a central opening, thereby to force the bakery dough toward said pan through said opening; such an apparatus wherein said drums have a surface of nylon; such an apparatus wherein said drums are grooved; such an apparatus wherein said doctor means has an arcuate surface in contact with the upper surface of said cavity pan; such an apparatus wherein said doctor means is in the form of a doctor blade or roll; such an apparatus wherein said doctor means is in the form of a cylinder; such an apparatus wherein said doctor means is in the form of a non-rotatable cylinder; such an apparatus including housing means for restraining the dough within a volume defined by said housing; such an apparatus including restraining means for restraining said dough to the upper surface area of one or more cavity pans to be filled therewith; such an apparatus wherein said restraining means includes one or more side retainer rails for preventing the dough from oozing outwardly at the sides; such an apparatus wherein a side retainer rail is adjustable laterally; such an apparatus including a barrier plate at an exit end of said housing for preventing the dough from oozing out of the housing forwardly; such an apparatus wherein said barrier plate cooperates with said doctor means to force dough into contact with said doctor means; such an apparatus wherein said barrier plate is an angled barrier plate; such an apparatus wherein said barrier plate is a part of a removable barrier plate assembly; such an apparatus wherein said barrier plate assembly is mounted on side retainer rails; such an apparatus wherein said barrier plate assembly is removably secured in place on said side retainer rails; such an apparatus wherein said doctor means is in contact with the upper surface of said cavity pan; such an apparatus wherein said doctor means is mounted so as to allow said means to move upwardly if displaced by pan irregularities or excess dough but to return to such contact if displaced therefrom; such an apparatus wherein said rotatable compaction means is in contact with the upper surface of said cavity pan; such an apparatus wherein said rotatable compaction means is mounted so as to allow said means to move upwardly if displaced by pan irregularities or by excess dough but to return to said contact if displaced therefrom; such an apparatus wherein said doctor means is mounted in upwardly- and downwardly-movable mounting blocks which are spring-biased to return to a downward location wherein said doctor means is in contact with the upper surface of said cavity pan; such an apparatus wherein said rotatable compaction means is mounted in upwardly- and downwardly-movable bearing blocks which are spring-biased to return to a downward location wherein said compaction means is in contact with the upper surface of said cavity pan; such an apparatus wherein vertical rods are secured to mortised mounting blocks and extend through comortised spring means and terminate in locking means for adjustment and securement of the spring-bias of said doctor blade means; such an apparatus wherein vertical rods are secured to mortised bearing blocks and extend through comortised spring means and terminate in locking means for adjustment and securement of the spring-bias of said rotatable compaction means; such an apparatus wherein said doctor means has a weight of at least 60 pounds; such an apparatus wherein said rotatable compaction means has a weight of at least 100 pounds; such an apparatus wherein said doctor means exerts a downward force upon the upper surface of said cavity pan of at least about 60 pounds; such an apparatus wherein said doctor means exerts a downward force between about 60 and about 200 pounds on the upper surface of said cavity pan; such an apparatus wherein said rotatable compaction means exerts a downward force upon the upper surface of said cavity pan of at least about 100 pounds; such an apparatus wherein said rotatable compaction means exerts a downward force upon the upper surface of said cavity pan of at least about 200 pounds; such an apparatus wherein the ratio of the rate of linear advancement of a cavity pan by said conveyor means to the rate of rotation of said rotatable compaction means when converted to a linear figure is between about 1:2.5 and about 1:7.5; such an apparatus wherein said ratio is at least about 4:1; such an apparatus wherein the ratio is about 5; such an apparatus wherein said conveyor means comprises endless conveyor belt or chain means and associated drive means; such an apparatus wherein said conveyor means comprises cleats and wherein said cavity pan comprises cooperating engaging means for engagement with said cleats; such an apparatus wherein said conveyor means comprises cleats adapted to engage cooperating portions of cavity pans to ensure conveyance of cavity pans in and through said apparatus; such an apparatus wherein said cleats are secured to said conveyor means and tapered so as to allow clearance of said cleats as they proceed on an endless course of travel of said conveyor means in said apparatus and around the drive means thereof; such an apparatus wherein said dough-feeding means and hopper are located vertically above the path of travel of a cavity pan as conveyed by said conveying means so as to utilize the force of gravity; such an apparatus wherein said housing contains at least one clean-out aperture which, in operation, is covered by a removable cover plate; and such an apparatus including a cavity pan comprising a sheet of solid aluminum or magnesium alloy, with openings drilled therein.

Moreover, a method of filling bakery dough into a cavity pan, which is a pan having upper and lower surfaces and side edges with cavities formed in the upper surface thereof, for containment of bakery dough in said cavities, in preparation for baking of the same, comprising the following steps in combination:

providing a source of bakery dough to be filled into the cavities of said cavity pan;

providing feeding means for feeding the bakery dough from said source to the cavities of said cavity pan;

feeding said dough to said cavities by means of said feeding means;

providing rotatable compaction means for forcing said dough into the cavities of said cavity pan;

forcing said dough into said cavities by means of said rotatable compaction means;

providing doctor means for finalizing the level of said dough in said cavities and removing excess dough from said pan;

finalizing the level of said dough in said cavities and removing excess by using said doctor means;

providing conveyor means for conveying said cavity pan from one of said operations to the next;

conveying said cavity pan from said feeding means to said compaction means to said doctor means for said successive operations by means of said conveyor means; and providing driving means for driving said conveyor means, said feeding means, and said rotatable compaction means; such a method wherein the cavity pan employed comprises a sheet of solid aluminum or magnesium alloy, with openings drilled therein; such a method wherein the cavity pan is heated prior to feeding the bakery dough into said cavities; such a method wherein the cavity pan is heated to a required baking temperature before feeding the bakery dough into the cavities of said cavity pan; such a method wherein the cavity pan is heated prior to feeding the bakery dough into said cavities; such a method wherein the cavity pan is heated to a required baking temperature before feeding the bakery dough into the cavities of said cavity pan; such a method wherein at least two (2) cavity pans are filled during each operation; such a method wherein the method is carried out intermittently, with at least two (2) pans being filled in each operation; such a method wherein the rotatable compaction means is caused to rotate at a sufficient speed of rotation so as to provide a ratio of the linear distance of travel of a point on the circumference thereof of at least 2.5:1 as compared with the linear distance of travel of a cavity pan on the conveyor during the same time period; such a method wherein the ratio of travel is between about 2.5:1 and 7.5:1; such a method wherein said dough-feeding means is provided in the form of a rotatable feeding means; such a method wherein said dough-feeding means is provided in the form of a double-drum feeding means, the drums of which rotate in opposite directions toward a central opening, thereby forcing the bakery dough toward said pan through said opening; such a method wherein said drums are provided in the form of drums having a surface of nylon; such a method wherein said drums are provided with grooved surfaces; such a method wherein said doctor means is provided with an arcuate surface and is maintained in contact with the upper surface of said cavity pan; such a method wherein said doctor means is provided in the form of a doctor blade or roll; such a method wherein said doctor means is provided in the form of a cylinder; such a method wherein said doctor means is provided in the form of a non-rotatable cylinder; such a method wherein housing means is provided for restraining the dough within a volume defined by said housing; such a method wherein restraining means is provided for restraining said dough to the upper surface area of one (1) or more cavity pans being filled therewith; such a method wherein one (1) or more side retainer rails are provided for preventing the dough from oozing outwardly at the sides; such a method wherein a barrier plate is provided at an exit end of said housing for preventing the dough from oozing forwardly out of said housing; such a method wherein said barrier plate is made to cooperate with said doctor means to force dough into contact with said doctor means; such a method wherein said doctor means is maintained in contact with the upper surface of said cavity pan; such a method wherein said doctor means is mounted so as to allow said means to move upwardly if displaced by pan irregularities or excess dough but to return to such contact if displaced therefrom; such a method wherein said rotatable compaction means is maintained in contact with the upper surface of said cavity pan; such a method wherein said rotatable compaction means is mounted so as to allow said means to move upwardly if displaced by pan irregularities or excess dough but to return to said contact if displaced therefrom; such a method wherein said doctor means has a weight of at least 60 pounds; such a method wherein said rotatable compaction means has a weight of at least 100 pounds; such a method wherein said doctor means is caused to exert a downward force upon the upper surface of said cavity pan of at least about 60 pounds; such a method wherein said doctor means is caused to exert a downward force between about 60 and about 200 pounds on the upper surface of said cavity pan; such a method wherein said rotatable compaction means is caused to exert a downward force upon the upper surface of said cavity pan of at least about 100 pounds; such a method wherein said rotatable compaction means is caused to exert a downward force upon the upper surface of said cavity pan of at least about 200 pounds; such a method wherein the rate of linear advancement of a cavity pan by said conveyor means is maintained between about 1:2.5 and about 1:7.5 compared with the rate of rotation of said rotatable compaction means when converted to a distance figure; such a method wherein said rotatable compaction means is caused to rotate a predetermined distance at a predetermined rate compared with the rate of advancement of a cavity pan on said conveyor, said predetermined rate being at least about 4:1; such a method wherein the rate is about 5:1; such a method wherein said doctor means is caused to exert a downward force upon the upper surface of said cavity pan of at least about 60 pounds, wherein said rotatable compaction means is caused to exert a downward force upon the upper surface of said cavity pan of at least about 100 pounds, and wherein the rotatable compaction means is caused to rotate at a sufficient speed of rotation so as to provide a ratio of the linear distance of travel of a point on the circumference thereof of at least 2.5:1 as compared with the linear distance of travel of a cavity pan on the conveyor during the same time period; such a method wherein the ratio of travel is between about 4:1 and 7.5:1; such an apparatus wherein said doctor means exerts a downward force upon the upper surface of said cavity pan of at least about 60 pounds, wherein said rotatable compaction means exerts a downward force upon the upper surface of said cavity pan of at least about 100 pounds, and wherein the rotatable compaction means rotates at a sufficient speed of rotation so as to provide a ratio of the linear distance of travel of a point on the circumference thereof of at least 2.5:1 as compared with the linear distance of travel of the cavity pan on the conveyor during the same time period; such an apparatus wherein the ratio of travel is between about 4:1 and 7.5:1; such an apparatus wherein the rotatable compaction means rotates at a sufficient rate so that it rotates a plurality of times during the passage of a cavity pan thereunder; and such a method wherein the rotatable compaction means is caused to rotate at a sufficient rate so as to ensure that the rotatable compaction means rotates a plurality of times during the passage thereunder of a cavity pan.

BRIEF DESCRIPTION OF THE DRAWINGS

Reference is now made to the drawings, in which:

FIG. 1 is a top plan view, partially schematic, of apparatus in accord with the invention showing the entrance end of the apparatus to the right and the exit end of the apparatus to the left, and in which various elements are shown in phantom lines, as in several additional FIGS. of the Drawings, for a better understanding of the invention;

FIG. 3 is a schematic view of the conveyor drive mechanism;

FIG. 4 is schematic view of the dual dough roller drive mechanism;

FIG. 5 is a top plan view of a cavity pan employed according to the present invention;

FIG. 6 is an end cross-sectional view of the tray of FIG. 5 taken along the line 6—6 of FIG. 5;

FIG. 7 is a side cross-sectional view of the tray taken along the line 7—7 of FIG. 5;

FIG. 10 is a partial exit end view of the apparatus of FIG. 1 with the barrier plate assembly in place between the retainer rails;

FIG. 11 is a side view of FIG. 10 with the exit end to the left and the entrance end to the right;

FIG. 12 is an enlarged partial view at the exit end or forward portion of the apparatus as shown in FIG. 2, showing the inside of the far depending wall member 202 with certain elements in phantom lines for better viewing of the wall member;

FIG. 15 is a schematic view of an injection-compaction roller drive mechanism which may be employed according to the present invention;

FIG. 16 is an enlarged view of a preferred conveyor-cleat arrangement involving a chain conveyor and sprocket.

DETAILED DESCRIPTION OF THE INVENTION

Figure 2:
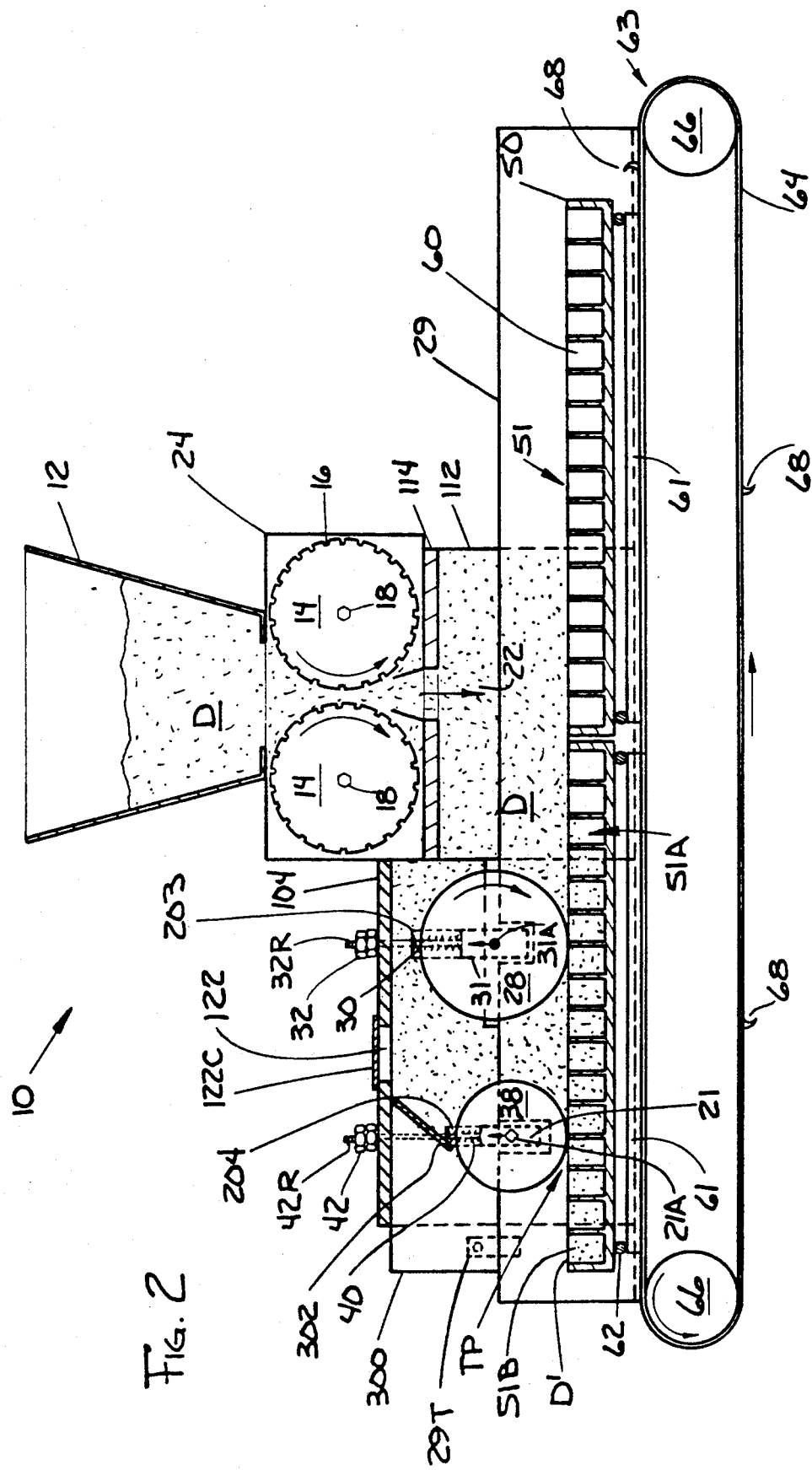
FIG. 2 is a cross-sectional view, also partially schematic, taken along the line 2—2 of FIG. 1.

The invention will be better understood from an inspection of the accompanying drawings, wherein all of the relevant parts and elements are numbered and wherein the same numbers are employed to refer to the same parts or elements throughout.

From FIG. 1 the cavity pan filling apparatus of the present invention is seen generally in top plan view at 10. A more revealing cross-sectional view thereof along line 2—2 of FIG. 1 is visible in FIG. 2. Cavity pans of the type employed for making cookies, bon-bons, or "butterballs" in connection with the method of the present invention and utilized in connection with the cavity pan filling apparatus of the present invention are seen in FIGS. 5, 6, and 7.

As seen from FIGS. 5, 6, and 7, such cavity pans may comprise a pan or tray 50 having cavities 51 with an essentially cylindrical interior bore 60, inner generally vertical cavity walls 58, generally horizontal cavity bottoms 56, outer generally vertical side walls 54, and a generally horizontal bottom 52. Trays or pans 50 are advantageously supported on transverse solid crossbars 62, which in turn may be supported on longitudinal solid or hollow crossbars 61, which in turn may rest upon conveyor belt or chain 64 according to the method and apparatus of the present invention, where transverse supports 62 are engaged by cleats 68 for movement of the cavity pans or trays 50 along on conveyor belt or chain 64 from right to left as the conveyor belt is advanced by pulleys or sprockets 66 which also comprise a part of the conveying or advancing means 63. Rectangular hollow crossbars 61 are advantageously employed when the pans 50 are to be manipulated by means of handles insertable therein.

Figure 9:
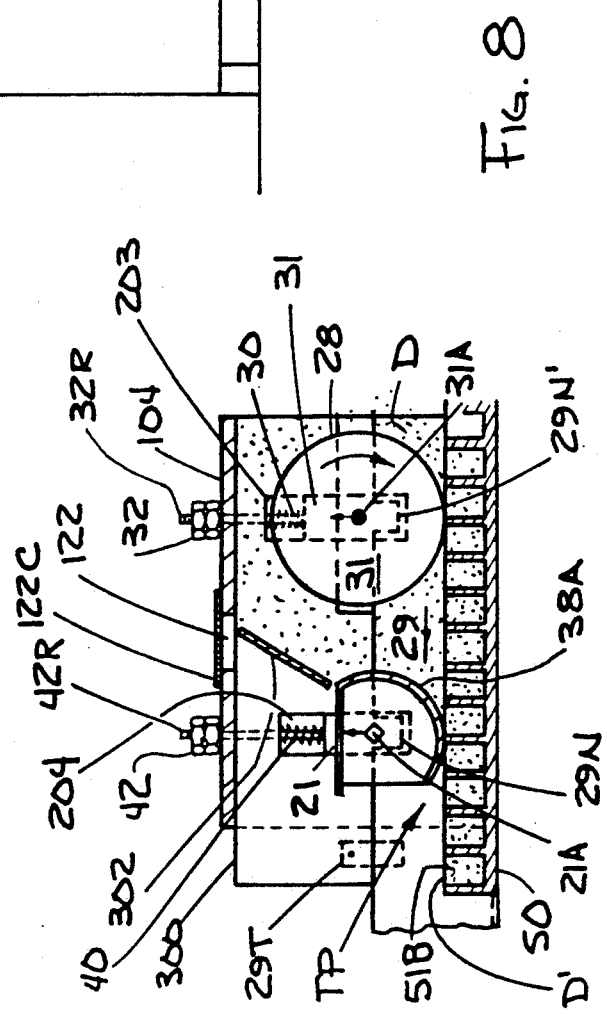
FIG. 9 is a side view of the assembled apparatus.

Referring now to FIG. 9 for a view of the general assembly of the apparatus of the invention, the assembly is situated upon floor F, where basic guarding and steel frame 25 is supported by support means 27 in the form of legs, wheels, or the like and which, as shown, is in the form of legs 27. See FIG. 13 for an end view thereof.

Supported by said steel frame is conveying or advancing means 63, which is in turn supported by conveyor support means 63S and surmounted by side retainer rails in the form of angle irons 29 for close containment of cavity pans 50 as they move along with conveyor belt or chain 64, at least one of said rails 29 advantageously being laterally adjustable by means of securable pins 29P in lateral slots in rail 29 for maintaining a close-fitting relation of rails 29 with the side walls 54 of trays 50. Also superposed upon said frame 25, and supported at a suitable distance thereabove by suitable bridges or arches to permit access and passage therebeneath of trays 50, are one or more housings, forming a continuous tunnel for passage of trays 50 on belt 64. As shown, housing 24 containing double dough rollers 14,14 with dough hopper 12 superposed thereabove, this housing being supported by a bridge or arch with outer vertical walls 112 and span 114. Although hopper 12 as shown has slanted sidewalls, vertical walls are sometimes advantageous, especially when bakery dough which is prone to "bridging", "hanging up", or sticking is to be employed. Forward and to the left of housing 24 in FIG. 9 is either a separate housing or a continuation of housing 24, as shown formed by outer vertical walls 102 and span 104, within which are contained rotatable injection/compaction drum 28 and non-rotatable dough-leveler and trimmer means in the form of doctor blade roll 38, elements 14, 28 and 38 being shown in shadow lines. Removable barrier plate 302 is shown forward of injection/compaction roller 28 and in close-fitting relationship to doctor blade roll 38, the usual clearance being about 1/16 inch. Removable barrier plate 302 is provided as a part of removable barrier plate assembly 300, the side walls of which surmount retainer rails 29 and are retained in place atop retainer rails 29 by retainer means including tabs 29T on retainer rails 29 and bolt B in an aperture in the tabs 29T and through openings in the sidewalls of removable barrier plate assembly 300, as better shown in FIG. 11.

Injection/compaction roller or drum 28 and doctor blade roll 38 are supported from span 104 by depending inner wall members 202 in a manner more clearly shown by reference to FIGS. 2, 8, 12, 13, and 14.

Figure 8:
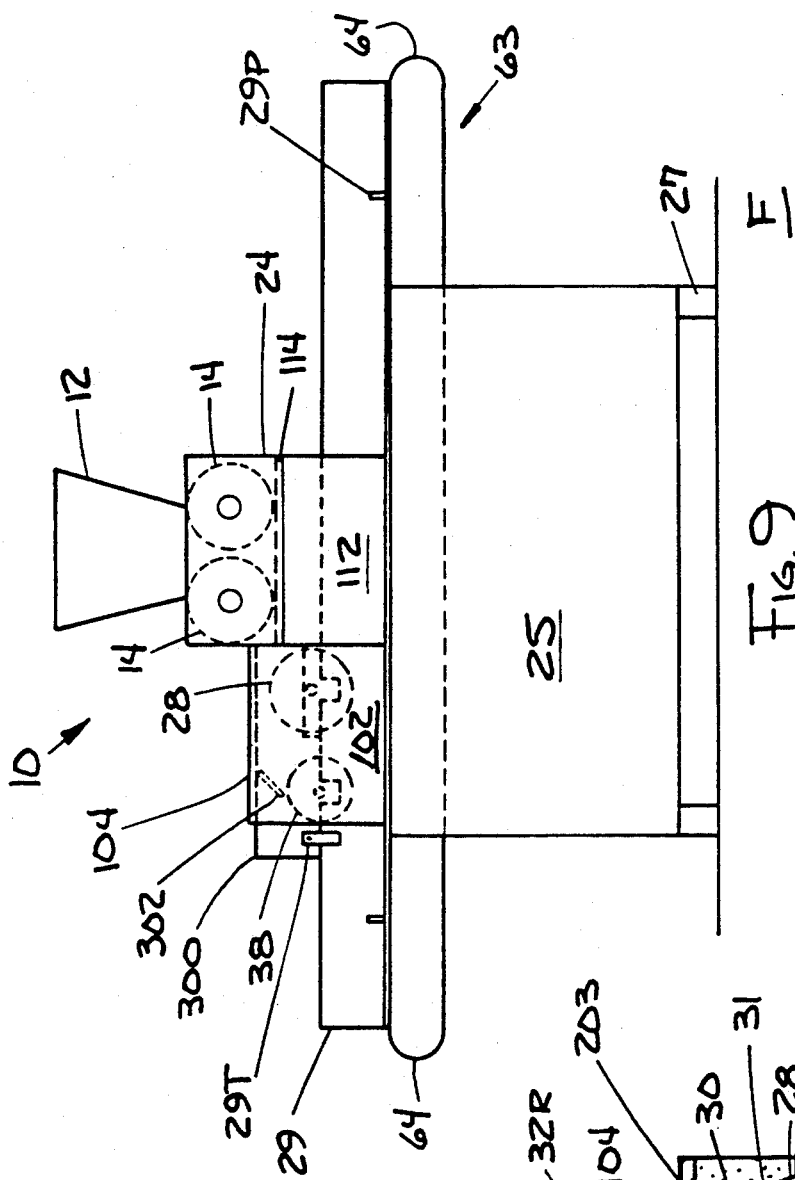
FIG. 8 is a partial cross-sectional view like FIG. 2 showing alternate doctor blade means structure.

In FIG. 8 is shown a modification of the apparatus of the invention. In FIG. 8, cavity pan 50, now with filled cavity 51B, is shown emerging from trimming point TP with level dough D' filled cavities at 51B as a result of the action of dough leveler and trimmer in the form of arcuate doctor blade 38A, retained in spring-biased relation to the top of cavity pan 50 by means of spring 40 and tensionadjusting means in the form of knob or nut 42 positioned exteriorly of span 104, and threaded rod 42R. The forward portion of barrier plate assembly 300 is visible in this FIG. 8, as well as the removable barrier plate 302 itself, injection-compaction roller 28, mounted for rotation about axis 31A journaled for rotation in bearing block 31 and retained in spring-biased relation to the top of cavity pan 50 by means of spring 30 and adjusting means in the form of lockable hex nuts 32, positioned exteriorly of span 104 and threaded rod 32R. Dough being injected and compacted into cavities 51 in cavity pan 50 by injection-compaction roller 28 and leveled off therein at trimming point TP by dough leveler and trimming means in the form of doctor blade 38A is indicated throughout as D.

Referring again to FIGS. 1 and 2, all of the elements previously described are visible, including forward removable barrier plate assembly 300, locked together limiting double hex nuts 32 and 42, housing 24 located upon span 114, dual dough rollers 14,14 and superposed dough hopper 12. Also shown are gearbox and motor 69 cooperating with double drive gearbox 71 and double drive shafts 18,18 for driven rotation of double dough rollers 14,14. In addition, conveyor drive arrangement 67 for driving of the conveyor sprocket or pulley 66 portion of conveyor or advancing means 63, conveyor belt 64 with cleats 68 thereon, cavity pan or tray 50 with unfilled cavities 51 of generally cylindrical interior bore 60 upon entry beneath the filling apparatus of the invention and, upon exit at the left-hand side of FIG. 1, having filled cavities 51B, are all visible. As will be apparent, limiting nuts 32 and 42 are respectively positioned exterior of span 104 and the forward removable barrier plate assembly 300 with its barrier plate 302 is shown inserted therein vertically atop containment rails 29 and alongside injection-compaction roll or drum 28 and the doctor roll 38 or blade 38A, with barrier plate 302 in close proximity to the top edge of doctor roll 38 or doctor blade 38A. (See FIG. 8.)

Referring particularly to FIGS. 2, 4, 8, 9, and 13, dual dough rollers 14,14, as shown having optional grooves 16 in the surfaces thereof, are mounted upon axles 18,18 and driven as described hereinafter. Injection-compaction roll or drum 28 is shown as rotating in the direction of movement of the cavity pan 50 about axis 31A mounted in bearing blocks 31 fit into through-mortises 203 in depending wall members 202, the tension upon which roll 28 is controlled by spring 30 within mortises 203 and also tension-controlled by threaded hex nuts 32 atop threaded rods 32R, which extend down through unthreaded openings in span 104 and down through shafts or passageways in depending wall members 202 into mortises, as shown through-mortises 203, and finally into bearing blocks 31 in which rods 32R are threadedly secured in threaded apertures (See 21T in FIG. 14). The same tensioning arrangement exists with regard to the non-rotating leveling means, i.e., the doctor roll 38 or doctor blade 38A, the tensioning elements being hex nuts 42, rod 42R, mounting blocks 21, mortises 204, and springs 40, the doctor roll 38 being secured against rotation by means of rectangular axle 21A mounted for non-rotation in mounting blocks 21, although a rotatable axle and pinning means to pin or key the axle and doctor roll 38 to mounting block 21 and against rotation is obviously suitable alternative means.

From FIGS. 1 and 2, it will be apparent that cavity pans 50 in advancing from right to left commence with empty cavities 51 and progress to cavities being filled at 51A and finally to filled cavities at 51B, after injection-compaction by roller 28 and finishing and/or trimming at trimming point TP with doctor roller 38, usually of solid steel, or arcuate doctor blade 38A, as shown in FIG. 8. Also as shown in FIG. 8, suitable notches 29N and 29N' may be provided in retainer rails 29 to permit axles or shafts 31A and 21A to be mounted or journaled in mounting or bearing blocks 21 and 31, in bearing block 31 via bearing 31B (See FIG. 12), since retaining rails 29 are located inwardly of depending wall members 202 in which the mounting or bearing blocks 21 and 31 are mortised in mortises 204 and 203.

Figure 13:
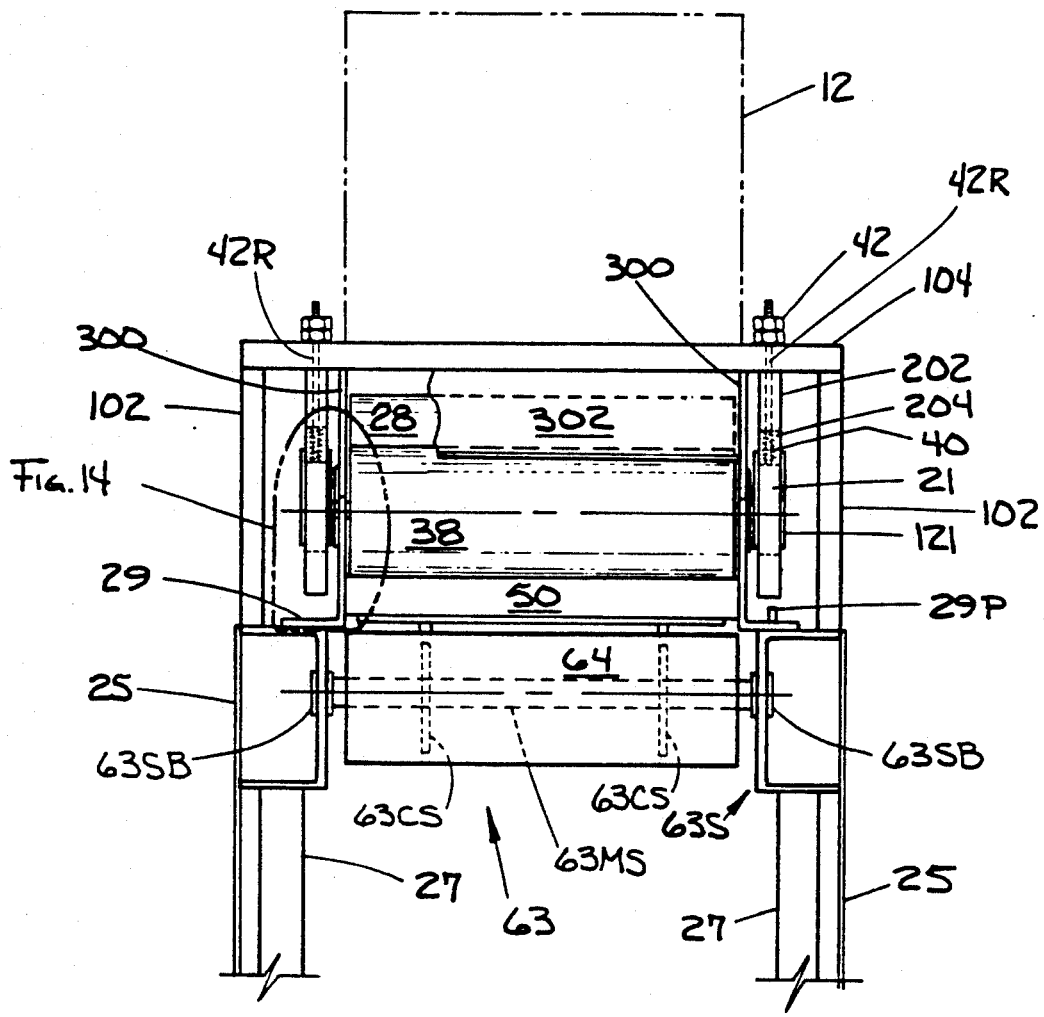
FIG. 13 is a front end view of the exit or discharge end of the apparatus.

Looking again at FIG. 1 in conjunction with FIGS. 2, 9, and 13, the support means 25 and 27 terminate in a channel portion 63S, which channel serves as conveyor support means as well as support means for the bridge or arch structures which in turn support the dough-metering means involving twin or dual rollers 14 and hopper 12 as well as housing 24, and comprising outer vertical walls 112 along with span 114, usually of approximately one-inch steel plate. Centrally of span 114 is aperture 22 for the feeding of dough downwardly between dual rollers 14 into the lower portion of the housing, cavity, or tunnel formed by the series of arches or bridges which, as previously stated, may be in the form of one continuous bridge or arch, if desired. Forwardly of the dough-metering assembly are located a further bridge or arch with outer vertical support walls 102 with their span 104, said span as previously disclosed supporting two inner depending vertical wall members 202, in which the mortises 203 and 204, previously described, as located, as well as openings, channels, or shafts therein for the threaded rods 42R extending into the mounting or bearing blocks 21 and 31, and retained in said through-mortises by block retaining plates 121 and 131. Centrally of said span 104 is located clean-out aperture 122 which, in operation of the apparatus, is covered by cover plate 122C.

Whether or not outer wall 102 rests upon frame 25 or the top of support means 63S, or both outer walls 102 and 112 rest upon 25 or 63S, is immaterial. In another embodiment, wall 112 does rest upon support means 63S, whereas wall 102 rests upon an inwardly-extending flange which serves the same purpose as the horizontal top of 63S for inward support of wall 102 and retainer rails 29 which, in addition to being provided in the form of a simple flange secured to frame 25, can also be simply provided as a bend of the material of construction of frame 25, the object in any case being to support walls 102, 112, and retainer rails 29. In addition, channel portion 63S may also be omitted, and frame 25 upwardly extended and provided in a form which is linear and devoid of a channel, in which case such a supporting flange would be secured to or be a part of the linear frame 25, as will be apparent to anyone skilled in the art.

The details of the removable barrier plate assembly 300 and its contained barrier plate 302 are most clearly seen from FIGS. 10 and 11.

The details of the mounting or bearing blocks 21 and 31 and their positioning in mortises 203 and 204 in depending inner wall members 202 are most clearly seen from FIGS. 8, 12, 13, and 14.

Figure 14:
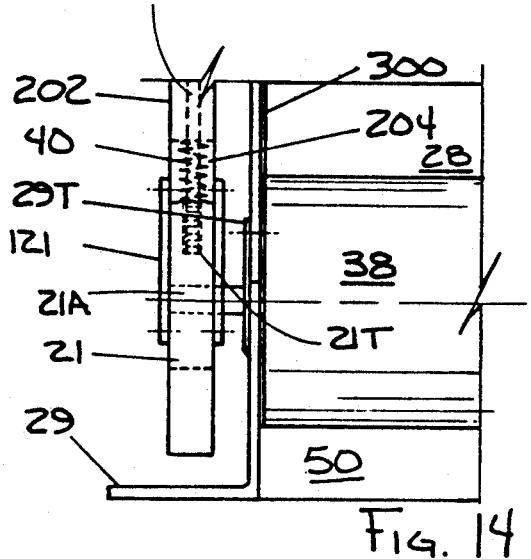
FIG. 14 is an enlarged partial section of the apparatus as shown in FIG. 14.

The forward bridge or arch construction of the apparatus of the invention, and its depending inner wall members, as well as a total end view of the front of the apparatus is most clearly seen from FIGS. 8, 13, and 14. Referring further to FIG. 13, the conveyor belt 64 at the exit end of the device is clearly visible and, as shown, is mounted over roller 66, in turn keyed upon a 1¼ inch solid main shaft 63MS journaled in bearings 63SB. In phantom lines is shown the arrangement when, instead of a conveyor belt 64, twin endless chains 464 are employed (not shown in FIG. 13, but see FIG. 16). In such embodiment, two chain sprockets 63CS drive the twin endless chains 464, the drive sprocket 66DS not being visible since it is at the other end of the apparatus, as indicated in FIGS. 1 and 3. When twin endless chains 464 are employed, all of the sprockets are approximately five inches in diameter and the two chain sprockets 63CS are mounted upon main shaft 63MS as shown in the phantom lines of FIG. 13.

The drive arrangement 67 for driving conveyor sprocket or pulley 66 of conveyor or advancing means 63 is shown in FIG. 3. The motor sprocket 75 of a motor (not shown) drives belts or chains 77 through gearbox 79 and around conveyor sprocket or pulley 66, thereby imparting movement to conveyor belt or chain 64 advantageously complete with cleats 68 as previously described, and as further shown in FIGS. 16 and 17.

One suitable arrangement involves a ¾ horsepower dedicated variable speed D.C. electric motor with an approximately 3.5:1 ratio into the gearbox 79 which, in turn, provides an additional 25:1 ratio, and which in turn drives the conveyor sprocket or pulley 66 with a ratio of approximately 1.2:1, for an approximate total gear ratio of 105:1 (ca. 100:1), all of the relevant pulleys being connected by chains or belts 77 in the usual manner according to the convention of the art. The advancing or conveying means 63 as usual generally involves a conveyor sprocket or pulley 66, driving the endless chain or belt 64 as already described.

In FIG. 4 is shown the drive means for the dual dough rollers 14,14. The gearbox 69 and motor (not shown) drive gear 69A which in turn drives chain or belt 73 around gear 71A within double drive gearbox 71, thereby in turn driving dual dough rollers 14,14 mounted upon dual axles 18,18.

Concerning the dual dough-feed rollers of FIG. 4, a suitable drive motor is an A.C. ½ horse power variable speed motor, and a relatively slow speed of ten (10) rpm has been found suitable. The motor (not shown) inputs to gearbox 69, the ratio of which is conveniently approximately 95:1, the output sprocket 69A of the gearbox being chain-connected to the input sprocket 71A driving axles 18,18 of the dual dough-feed rollers 14,14, the ratio of these two (2) sprockets conveniently being approximately 2:1.

From FIG. 15 is seen the drive mechanism for the injection-compaction roller 28, which is usually hollow and of stainless steel or other suitable material of construction. Pulley 49 is mounted coaxially on axle 31A with injection-compaction roller 28 and keyed thereto. Pulley 49 is driven by chain or belt 45, in turn driven by gears in gearbox 47, the driven gear 39 of which is driven by chain or belt 43, in turn arranged around motor sprocket 41 and driven by a motor (not shown). A suitable arrangement involves the employment of a ¾ horsepower D.C. dedicated power drive motor driving the gearbox 47 providing a 50:1 gear ratio which, in turn, drives a further pulley 39 as shown with an approximately 1:1 ratio this, in turn, driving the pulley 49 keyed to the axle of roller 28 or directly affixed thereto with an approximately 1:1 ratio, all of the pulleys being connected in usual manner by endless chains or belts.

The gear or sprocket 69A, as shown in FIG. 4, can be connected with a chain or belt to sprocket 41, if desired, or the gear or sprocket 69A in gearbox 69 may be identical with gear or sprocket 41, provided that the gear ratios involved in gearbox 69 and in gearbox 47 are selected so as to provide the proper rotational ratios between the dual dough rollers 14,14 and the injection-compaction roller 28 or, even more importantly, provided that the rotational relationship of injection-compaction roller or drum 28 and conveyor pulley 66 are coordinated, as will be explained more fully hereinafter. However, the various (generally three) driven elements of the apparatus of the invention are most advantageously independently driven and controlled and manually or automatically synchronized for each operation of the apparatus.

Cavity pans employed according to the present invention, as illustratively shown in FIGS. 5–7, may conveniently be formed of 5/8 inch thick solid aluminum or magnesium alloy, preferably aluminum alloy, and may conveniently have ten cavities in one direction and sixteen cavities in the other direction, each of which may be approximately 1⅛ inch in diameter and approximately 9/16 inch deep. The overall width may advantageously be approximately 12 inches and the overall length approximately 18½ inches. A ½ inch square solid steel rod may advantageously be bolted or otherwise secured to the bottom of the cavity pans in width direction, to facilitate engagement of the pan by the lugs or cleats 68 on the conveyor belt or chain 64 and this ½ inch solid steel rod may in turn have secured thereto at the bottom thereof, by welding or other suitable means, a hollow square bar across the length thereof which may advantageously be ½ inch square, which hollow steel square bars will accept insertable but removable handles. Advantageously, two hollow steel square bars are provided lengthwise of each of said trays and the two solid steel rods are provided at the ends and widthwise of said trays although, as will be apparent to one skilled in the art, the directions could be altered or even reversed. Accordingly, with the cavity pan size just described, approximately 160 cavities will be provided per pan, and the cavities per pan will be approximately 1⅛ inch in diameter and approximately 9/16 inch deep. They will advantageously be drilled and cylindrical with essentially vertical side walls 54, as shown.

The overall length of the apparatus of the invention is generally such as to accept, beneath the operative elements thereof, including the dough feed drums 14,14 and the injection/compaction roll 28 as well as the doctor roll or blade means 38 or 38A, at least two cavity pans of approximately 18½ inches length each and approximately 12 inches in overall width. Although the operative elements as described may or may not extend over the length of two cavity pans, at least two of the cavity pans are advantageously located upon the conveying or advancing means 63 and at least one of the cavity pans is advantageously located at all times during operation underneath the operative elements comprising the dough feeding drums, the injection/compaction roller, and the doctor roll or blade means.

The injection/compaction roller 28 may advantageously be approximately five (5) inches in diameter and of polished steel, whereas the dual dough feed drums 14,14 are advantageously of approximately the same diameter, but of nylon, cast aluminum, Teflon-coated material, or other suitable material so as not to provide a permanent but only a temporary and releasable gripping surface for the dough being forced therebetween and, in any event, may advantageously be provided with indentations, grooves, or the like to assist gripping of the dough as it proceeds therebetween. The doctor drum or blade means is preferably at least partially arcuate and of approximately three (3) inches in diameter or partial diameter (when in blade form) and both the doctor means 38 or 38A and the roller means 28 are provided with downwardly-tensioning springs 30 and 40, as already described.

Figure 17:
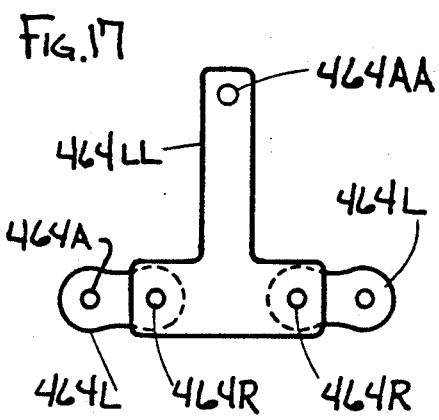
FIG. 17 is a detail of the conveyor chain link to which the cleat of FIG. 16 is attached for limited rotation.

FIG. 16 shows an enlarged view of a preferred conveyor-cleat arrangement involving a chain conveyor and sprocket, the chain being generally shown at 464 and the cleat being identified as 468. The normal chain links are identified as 464L, whereas the special chain link, to which the cleat 468 is anchored for no or limited rotation, is designated 464LL. The chain links 464L and 464LL are rotatably secured together in usual manner by rivets 464R passing through link apertures 464A. The cleat 468 has leading edge 468LE for engagement of tray cross bars 62, as shown in FIG. 2, as well as tapered edge 468T, trailing edge 468TE, and bottom edge 468BE, the taper provided in tapered edge 468T being to permit clearance of cleat 468 at sprocket turns. Cleat 468 advantageously has a length of approximately two (2) inches, and is generally constructed of steel or equally strong material of construction to prevent buckling when pushing cavity pans along conveyor chain 464. Cleat 468 is mounted for swiveling or limited rotation by means of pin 468P through apertures 464AA in special link 464LL and the corresponding aperture through cleat 468, pin 468P comprising any suitable nut or bolt combination or like securing means permitting rotation or swiveling of cleat 468 about the pivot point through which passes pin 468P. Details of the special link are shown in FIG. 17, corresponding in all respects with the same elements as shown in FIG. 16. Alternatively, cleat 468 may be made non-rotatable or non-swivelable by replacement of pin 468P by a simple weld or by welding pin 468P so as to make it non-rotatable in the corresponding apertures, the cleats thus being hingedly or otherwise secured.

OPERATION

In operation, once the cavity pans are filled with dough, they may proceed directly to the oven for baking or, alternatively and in some cases advantageously, they may be inverted upon a further cavity pan having the same or somewhat larger openings and the second pan employed for the baking procedure or, in a further alternative procedure, they may be inverted upon a flat pan and the flat pan employed for the baking procedure or step.

Further, as to operation, the cavity pans are generally heated before being placed into use for the containment of bakery dough therein. In their heated condition, they are placed upon the conveyor and advanced linearly through the various stations or segments of the cavity pan filling apparatus of the invention, at least one pan generally being sent through prior to commencing full-scale operation of the apparatus of the invention for purposes of enabling the various drive means to be coordinated and to ensure a proper advancement of the cavity pan beneath the dough feeding means, thence beneath the rotatable compaction means for forcing the dough into the cavities of the cavity pan, and finally beneath the doctor blade or roll means for finalizing the level of the dough in the cavities and removing excess thereof at the trimming point at the exit end of the apparatus. After one or more cavity pans have been sent through the apparatus to make certain that all drive means are functioning properly and coordinated together, namely, the drive means on the advancing means, on the dough feeding means, and on the rotatable forcing or injection/compaction means for forcing the dough into the cavities of the cavity pan, normal operation can commence.

In this mode, the injection/compaction roller 28 ordinarily advantageously revolves approximately twelve (12) times during the course of passage of two 18½ inch cavity pans therebelow, for a linear ratio of approximately 5+:1, based upon an external circumference of sixteen (16) inches for roller 28. Moreover, this roller actually "floats" under the spring tension provided, exerting at least 100 pounds of downward force or pressure, and preferably exerting approximately 200 pounds of downward vertical pressure, on the cavity pan or dough located above the cavities therein, whereas the doctor drum 38 or its alternative structure 38A does not turn, but floats in the same manner as the roller 28, preferably exerting at least sixty (60) pounds, and preferably at least 100 pounds, of downward vertical pressure on the cavities and at the trimming point TP for trimming and leveling of the dough D which is injected and compacted into the cavities by means of roller 28. The tension provided by the tensioning means can obviously be varied at will dependent upon the strength of springs 30 and 40, as well as the usual expedient of decreasing the space between the mounting or bearing block 21 or 31 within the upper confines of mortises 203 or 204 by the provision therein of blocking means such as washers or the like, thereby compacting spring 30 and/or 40 and increasing downward pressure on roller 28 and/or arcuate doctor drum or blade 38 or 38A, such pressure being secured by tightening of the hex nuts 32 or 42.

Additional details follow.

KEY

CP=Cavity Pan
CPFM=Cavity Pan Filling Machine
ICFR=Injection/Compaction or Forcing Roll
EC=Endless Chain
DD=Doctor Drum
DF=Dough Feed

PREFERRED OPERATING SEQUENCE AND DETAILS

1. Dough is mixed to predetermined specifications.
2. CPs are heated in an oven until oven interior and CPs are at the required baking temperature, e.g., 350° F. This may require a plurality of passes through the oven and a period of about one hour.
3. Mixed dough is manually or automatically placed into hopper of CPFM.
4. A blank aluminum alloy pan-identical to other CPS except that it has no cavities--is inserted into CPFM by placing it on EC and then conveying it via EC drive train until it is in the CPFM housing interior or "maw". The EC drives the blank pan and all CPS, by the engagement of lugs with a round steel bar bolted to the CP.
5. DF drive (dedicated adjustable speed) motor is turned on. Twin grooved (nylon or other material) drums turn on their axles, one clockwise, the other counterclockwise. Grooves in the turning drums, when present, "grab" the dough and force it down through the aperture between them, into the maw, and onto the blank pan resting there, motionless.
6. The ICFR dedicated power drive is turned on. The action of the ICFR turning along with the DF turning fills every nook and cranny of the maw of the CPFM. At this point, the blank pan is still in place, motionless.
7. When dough starts oozing out small cracks and holes from the maw of the CPFM, the CPFM is judged to be fully "charged" with working dough, and ready to run.
8. Two hot CPs are placed on the infeed side of the CPFM, with the leading CP snug up against the blank pan, the second CP snug against the first. Simultaneously, all 3 power drives (DF, ICFR and EC) are turned on.
9. The EC drives all three pans (2 CPs+blank) as described under "4" above. As the blank pan emerges from the maw, it is manually lifted off the CPFM and placed snug up against the second CP on the infeed side. Thus, the blank pan is used to lead and follow. In effect, the blank pan is an "on-off" mechanism so dough is not wasted. When two pans are filled, the CPFM is shut off, and the blank pan again rests motionless where it started: in the CPFM maw. Therefore, the blank pan's leading and following actions are really one and the same. We start the CPFM, fill 2 CPs, and then halt the CPFM. We preferably fill in pairs and then rest until we are no longer limited by oven capacity.

10. As the trailing edge of the blank leaves the maw, the leading edge of the first CP is now *in* the maw, being filled with dough. The actual business part of the CPFM—packing cavities with dough—is accomplished by a marriage of four separate activities: horizontal CP motion from infeed to outfeed sides via the EC power train; the ICFR forcing the dough into the cavities as the CP moves past the ICFR; a constant supply of fresh dough being crammed into the maw via the DF drums; and a final dough packing/trimming action accomplished by the DD.

11. The polished spinning ICFR is 16" in circumference, and it preferably spins about six times in the course of filling one CP that is 18½ long, containing 160 cavities. It takes about thirty seconds to fill the 160 holes.

12. The ICFR floats as it spins. It floats on spring-loaded axle bearings. The downward force of optimally about 200 lbs. is exerted directly on the CP. Fats in the dough lubricate the metal-to-metal coefficient of friction to insignificance.

13. The ICFR does an imperfect job of packing dough into the cavities, hence the trailing DD. The DD does not spin, but it does float like the ICFR. The DD exerts at least 60 lbs. of downward force on the CP. The DD further packs and "sets" the dough in the cavities, and finishes the filled cavities flush, so that a filled, finished, and trimmed CP emerges from the housing after the trimming point.

14. The CP may then be manually or automatically loaded into the oven for baking.

15. The filled CPs are baked for an appropriate time, depending upon the recipe being employed. Temperature and time are as usual balanced for proper baking completion.

16. The hot baked cookies are turned out onto a conventional bakery pan, cooled on racks under appropriate cooling conditions, and packaged as desired.

SIGNIFICANT TECHNICAL CONSIDERATIONS

The ICFR must travel a much greater linear distance than the cavity pan which it fills. Best results are attained when the ICFR goes through six (6) revolutions in the course of filling one CP (a 5+:1 distance ratio). A disproportionate ratio is essential for good results. The dough itself acts like glue. Dough sticks to the ICFR, even if Teflon-coated, and it sticks to itself. If the ICFR were to be simply rolled across a CP heaped with dough, some dough might go into the cavities, but then the dough would at least partially pop out, sticking to the roller.

When the ICFR spins fast enough in relation to the velocity of the CP moving beneath it, the "popout" problem disappears. There is of course some upper limit as to how fast the ICFR can go. If it goes too fast, it will shear past the dough, and not effectively force dough into the cavities. A lower limit on ICFR rotational velocity is about three (3) revolutions per CP filled, six (6) revolutions per CP filled is ideal; and about nine (9) revolutions per CP is approximately the upper limit, depending of course on exact dough properties and conditions. Above nine (9), the first diminishing returns are apparent, whereafter incomplete filling occurs.

COMMENTS RE ESSENTIAL MACHINE PARTS AND PREFERRED MANNER OF OPERATION

Some essential machine parts according to the apparatus of the present invention are as follows:

1. A floating dough injection roll which spins on an axis and which preferably exerts at least 100 pounds of downward force against the cavity pan with the top surface of which it is in intimate contact.

2. Planar or flat die molds, herein referred to as cavity pans, the bottoms of which are in contact with the advancing means and the top surfaces of which are in intimate contact with the floating dough injection roll (rotating means for forcing dough into the cavities), and with the floating doctor means.

3. The floating doctor roll or blade, in intimate contact with the top surface of the cavity pan, which may or may not spin on an axis and which preferably exerts at least 60 pounds of downward force against the top surface of the cavity pan.

4. A dough-feeding device which, in a preferred embodiment according to the present invention, comprises counter-rotating twin dough feed rolls, ordinarily cooperating with a dough storage chamber or hopper.

5. Motors, drive, and controls, as previously described, as necessary to power and coordinate the dough feeding, injection/compaction roller, and conveyor means for movement of the cavity pan past the dough-feeding station, the injection/compaction roller station, and the doctor means and trimming point.

As previously stated, the preferred relative velocities involved in the rate of advancement of the cavity pan and the speed of rotation of the injection roller means are reducible in terms to relative distances. Preferably, for every unit of length through which the cavity pan moves past the injection roll, the injection roll should travel at least five (5) units of length. In the preferred device according to the invention, the injection roll is 16 inches in circumference and the cavity pan is 18½ inches long. For most successful dough filling and compaction of dough into the cavities, the injection roll should go through at least six (6) revolutions in the course of filling one (1) cavity pan, which is an approximately 5:1 distance ratio of injection roll surface to planar cavity pan surface. At a distance ratio of less than about 2.5:1, some dough may frequently adhere to the injection roll at the "out" nip thereof, thus at least partially undoing what was accomplished at the "in" nip, that is, the forcing of the dough into the cavities. At distance ratios above about 7.5:1, the injection of the dough into the cavities may become somewhat incomplete, since the injection roll spins so quickly that it shears past the dough and the dough, thus not adhering to the roller, is not forced by the roller into the cavity. Accordingly, the ratio is preferably between about 2.5:1 and 7.5:1, especially when thick and sticky dough is employed, although the ratios may of course be varied considerably as the thickness, stickiness, and adhesion characteristics of the dough being employed are varied within the skill of the art and according to the ambient temperature at the time.

Cavity pan 50 is advantageously constructed of solid aluminum or magnesium alloy sheet stock, at least ⅝ inch thick, the cavities being drilled therein to a depth of approximately 9/16 inch and being approximately 1¼ inch in diameter. This provides 10 cavities across the width of the pan and 16 cavities along the length of the pan, such a pan having an overall width of approximately 12 inches and an overall length of approximately 18½ inches. Thus, such a suitable pan comprises approximately 160 cavities arranged as set forth in the foregoing.

Solid aluminum or magnesium alloy cavity pans are advantageous for many reasons: The ease and relatively low cost of manufacture; their ability to act as a heat sink and ambient temperature-stabilizing element; less burned cookies due to uniformity of temperature than when using usual thin sheetform metal cavity pans; ability to withstand the large forces exerted during use without warpage; relative lightness as compared to steel pans; and convenience in the alteration and/or enlarging of cavities by milling of the cavities at will as and if desired.

FURTHER GENERAL COMMENTS RE SAME

The rotatable injection/compaction or forcing roller means is preferably maintained under a downward force or pressure of at least about 100 and preferably at least about 200 pounds, which force or pressure is exerted by the weight of the spinning steel dough injection roller itself in combination with the strong springs at its axle bearings augmented by the drive chain and sprocket exerting a force of its own. If less than such pressure is exerted, the dough compaction is usually less than complete. The cavities in the cavity pan ordinarily fill to their top only at the point directly below the rotatable compaction means which forces the dough into the cavities.

When the cavity pans are heated and the cavities are hot, the dough can pop out of the cavities and adhere to the spinning roll, so that the spinning roll must travel at a certain rate of speed, preferably at least such that the roller slips past filled cavities as it does when travelling at a proper speed. The roller most advantageously goes through about twelve revolutions in the course of filling two cavity pans, which means that the distance ratio is about 5+:1, the lower limit advantageously being about three revolutions per pan and about six revolutions being ideal. Above nine (9) revolutions per pan diminishing returns seem to set in, so about nine revolutions per pan is the preferred maximum.

Accordingly, every unit of length the cavity pan moves past the injection roll, the roll must therefore advantageously travel at least 2.5 and preferably at least five units of length.

The doctor roll or drum is preferably of solid steel, three inches in diameter, and may or may not rotate. The rotatable injection roller is preferably about five inches in diameter, with walls ¼ inch thick, and that means sixteen inches in circumference.

Both the doctor drum and the rotatable injection/compaction or forcing means "float" on the upper surface of the cavity pan. Again, the rotatable compaction means exerts at least 100 and preferably 200 pounds of downward vertical pressure on the cavity pan and preferably revolves about six times during the course of filling one 18½ inch long cavity pan.

The doctor drum preferably does not rotate, but also floats and usually exerts at least 60 and preferably at least 100 and up to 200 pounds of downward vertical pressure on the upper surface of the cavity pan. If the doctor roll is to be made rotatable, it can be mounted in bearing blocks in the manner of the rotatable injection/compaction or forcing roller means and simply allowed to rotate slowly, but in such case the doctor roller is advantageously made heavier or restraining means may be employed for purposes of minimizing its rate of rotation so as to provide most effective "doctoring", i.e. "finishing and trimming" of the dough in the cavities of the cavity pan at the trimming point, which is the point at which the cavity pan with the dough in the cavities, finished and trimmed, emerges from the housing at the forward or exit end of the apparatus of the invention.

It is thereby seen from the foregoing that the objects of the present invention have been accomplished and that a novel and efficient method for the filling of bakery dough into cavity pans has been provided, as well as novel apparatus for use in carrying out the said process, and whereby all of the previously-mentioned advantages have been attained and the innumerable and previously-insuperable shortcomings of the prior art have been obviated.

Although the preferred embodiments of the invention have been illustrated in the accompanying drawings and described in the foregoing Specification, it is to be understood that the invention is not limited to the exact embodiments disclosed or to the exact details of operation or exact compositions, methods, or procedures shown and described, since the invention is capable of numerous modifications, rearrangements, and substitutions of parts and elements and other equivalents, whether metallurgical, chemical, or mechanical, without departing from the spirit or scope of the invention, as will readily be apparent to one skilled in the art, wherefore the present invention is to be understood as limited only by the full scope which can be legally accorded the appended claims.

We claim:

1. Apparatus for filling viscous bakery dough into a cavity pan, which is a pan having upper and lower surfaces and side edges, with cavities formed in the upper surface thereof for containment of bakery dough in said cavities, in preparation for baking of the same, comprising the following elements in combination:
   1) conveyor means for conveying said cavity pan;
   2) driven dough-feeding means for drivingly feeding viscous dough to said cavity pan;
   3) rotatable compaction means rotating in direction of pan travel for forcing said viscous dough into the cavities of said cavity pan;
   4) doctor means for finalizing the level of said viscous dough in said cavities and removing excess dough from said pan;
   5) the direction of conveyance of said cavity pan being from said dough-feeding means to said compaction means to said doctor means;
   6) and means for driving said conveyor means, said dough-feeding means, and said compaction means.

2. Apparatus of claim 1 comprising also dough-storage means associated with said feeding means for storage of said dough just prior to entry into said feeding means.

3. Apparatus of claim 2, wherein said dough-storage means is a dough hopper.

4. Apparatus of claim 1, wherein said dough-feeding means is a rotatable feeding means.

5. Apparatus of claim 1, including housing means for restraining the dough within a volume defined by said housing means.

6. Apparatus for filling bakery dough into a cavity pan, which is a pan having upper and lower surfaces and side edges, with cavities formed in the upper surface thereof for containment of bakery dough in said cavities, in preparation for baking of the same, comprising the following elements in combination:
1) conveyor means for conveying said cavity pan;
2) dough-feeding means for feeding dough to said cavity pan;
3) rotatable compaction means for forcing said dough into the cavities of said cavity pan;
4) doctor means for finalizing the level of said dough in said cavities and removing excess dough from said pan;
5) the direction of conveyance of said cavity pan being from said dough-feeding means to said compaction means to said doctor means;
6) and means for driving said conveyor means, said dough-feeding means, and said compaction means, wherein said dough-feeding means is a double-drum feeding means, the drums of which rotate in opposite directions toward a central opening, thereby to force the bakery dough toward said pan through said opening.

7. Apparatus of claim 6, wherein said dough-feeding means and a dough-storage hopper are located vertically above the path of travel of a cavity pan as conveyed by said conveying means so as to utilize the force of gravity.

8. Apparatus of claim 6, wherein said drums have a surface of nylon.

9. Apparatus of claim 6, wherein said drums are grooved.

10. Apparatus for filling bakery dough into a cavity pan, which is a pan having upper and lower surfaces and side edges, with cavities formed in the upper surface thereof for containment of bakery dough in said cavities, in preparation for baking of the same, comprising the following elements in combination:
1) conveyor means for conveying said cavity pan;
2) dough-feeding means for feeding dough to said cavity pan;
3) rotatable compaction means for forcing said dough into the cavities of said cavity pan;
4) doctor means for finalizing the level of said dough in said cavities and removing excess dough from said pan;
5) the direction of conveyance of said cavity pan being from said dough-feeding means to said compaction means to said doctor means;
6) and means for driving said conveyor means, said dough-feeding means, and said compaction means, wherein said doctor means is in the form of a non-rotatable cylinder.

11. Apparatus for filling bakery dough into a cavity pan, which is a pan having upper and lower surfaces and side edges, with cavities formed in the upper surface thereof for containment of bakery dough in said cavities, in preparation for baking of the same, comprising the following elements in combination:
1) conveyor means for conveying said cavity pan;
2) dough-feeding means for feeding dough to said cavity pan;
3) rotatable compaction means for forcing said dough into the cavities of said cavity pan;
4) doctor means for finalizing the level of said dough in said cavities and removing excess dough from said pan;
5) the direction of conveyance of said cavity pan being from said dough-feeding means to said compaction means to said doctor means;
6) and means for driving said conveyor means, said dough-feeding means, and said compaction means, including restraining means for restraining said dough to the upper surface area of one or more cavity pans to be filled therewith, wherein said restraining means includes one or more side retainer rails for preventing the dough from oozing outwardly, wherein a side retainer rail is adjustable laterally.

12. Apparatus for filling bakery dough into a cavity pan, which is a pan having upper and lower surfaces and side edges, with cavities formed in the upper surface thereof for containment of bakery dough in said cavities, in preparation for baking of the same, comprising the following elements in combination:
1) conveyor means for conveying said cavity pan;
2) dough-feeding means for feeding dough to said cavity pan;
3) rotatable compaction means for forcing said dough into the cavities of said cavity pan;
4) doctor means for finalizing the level of said dough in said cavities and removing excess dough from said pan;
5) the direction of conveyance of said cavity pan being from said dough-feeding means to said compaction means to said doctor means;
6) and means for driving said conveyor means, said dough-feeding means, and said compaction means, including housing means for restraining the dough within a volume defined by said housing means, including a barrier plate at an exit end of said housing means for preventing the dough from oozing out of the housing means forwardly.

13. Apparatus of claim 12, wherein said housing means contains at least one clean-out aperture which, in operation, is covered by a removable cover plate.

14. Apparatus of claim 12, wherein said doctor means has an arcuate surface in contact with the upper surface of said cavity pan.

15. Apparatus of claim 12, wherein said doctor means is in the form of a roll.

16. Apparatus of claim 12, wherein said doctor means is in the form of a cylinder.

17. Apparatus of claim 12, including restraining means for restraining said dough to the upper surface area of one or more cavity pans to be filled therewith.

18. Apparatus of claim 17, wherein said restraining means includes one or more side retainer rails for preventing the dough from oozing outwardly.

19. Apparatus of claim 12, wherein said barrier plate cooperates with said doctor means to force dough into contact with said doctor means.

20. Apparatus of claim 12, wherein said barrier plate is an angled barrier plate.

21. Apparatus of claim 12, wherein said barrier plate is a part of a removable barrier plate assembly.

22. Apparatus of claim 21, wherein said barrier plate assembly is mounted on side retainer rails.

23. Apparatus of claim 22, wherein said barrier plate assembly is removably secured in plate on said side retainer rails.

24. Apparatus for filling bakery dough into a cavity pan, which is a pan having upper and lower surfaces and side edges, with cavities formed in the upper surface thereof for containment of bakery dough in said cavities, in preparation for baking of the same, comprising the following elements in combination:
1) conveyor means for conveying said cavity pan;

2) dough-feeding means for feeding dough to said cavity pan;
3) rotatable compaction means for forcing said dough into the cavities of said cavity pan;
4) doctor means for finalizing the level of said dough in said cavities and removing excess dough from said pan;
5) the direction of conveyance of said cavity pan being from said dough-feeding means to said compaction means to said doctor means;
6) and means for driving said conveyor means, said dough-feeding means, and said compaction means, wherein said doctor means is in contact with the upper surface of said cavity pan, wherein said doctor means is mounted so as to allow said doctor means to move upwardly if displaced but to return to such contact if displaced therefrom.

25. Apparatus of claim 24, wherein said doctor means is mounted in upwardly- and downwardly-movable mounting blocks which are spring-biased to return to a downward location wherein said doctor means is in contact with the upper surface of said cavity pan.

26. Apparatus of claim 25, wherein vertical rods are secured to mortised mounting blocks and extend through comortised spring means and terminate in locking means for adjustment and securement of the spring-bias of said doctor means.

27. Apparatus for filling bakery dough into a cavity pan, which is a pan having upper and lower surfaces and side edges, with cavities formed in the upper surface thereof for containment of bakery dough in said cavities, in preparation for baking of the same, comprising the following elements in combination:
1) conveyor means for conveying said cavity pan;
2) dough-feeding means for feeding dough to said cavity pan;
3) rotatable compaction means for forcing said dough into the cavities of said cavity pan;
4) doctor means for finalizing the level of said dough in said cavities and removing excess dough from said pan;
5) the direction of conveyance of said cavity pan being from said dough-feeding means to said compaction means to said doctor means;
6) and means for driving said conveyor means, said dough-feeding means, and said compaction means, wherein said rotatable compaction means is in contact with the upper surface of said cavity pan.

28. Apparatus of claim 27, wherein said cavity pan comprises a sheet of solid aluminum or magnesium alloy, with openings drilled therein.

29. Apparatus of claim 27, wherein said rotatable compaction means is mounted so as to allow said compaction means to move upwardly if displaced but to return to said contact if displaced therefrom.

30. Apparatus of claim 29, wherein said rotatable compaction means is mounted in upwardly- and downwardly-movable bearing blocks which are spring-biased to return to a downward location wherein said compaction means is in contact with the upper surface of said cavity pan.

31. Apparatus of claim 30, wherein vertical rods are secured to mortised bearing blocks and extend through comortised spring means and terminate in locking means for adjustment and securement of the spring-bias of said rotatable compaction means.

32. Apparatus for filling bakery dough into a cavity pan, which is a pan having upper and lower surfaces and side edges, with cavities formed in the upper surface thereof for containment of bakery dough in said cavities, in preparation for baking of the same, comprising the following elements in combination:
1) conveyor means for conveying said cavity pan;
2) dough-feeding means for feeding dough to said cavity pan;
3) rotatable compaction means for forcing said dough into the cavities of said cavity pan;
4) doctor means for finalizing the level of said dough in said cavities and removing excess dough from said pan;
5) the direction of conveyance of said cavity pan being from said dough-feeding means to said compaction means to said doctor means;
6) and means for driving said conveyor means, said dough-feeding means, and said compaction means, wherein said doctor means exerts a downward force upon the upper surface of said cavity pan of at least about 60 pounds, and including means for imparting such downward force.

33. Apparatus of claim 32, wherein said doctor means is in contact with the upper surface of said cavity pan.

34. Apparatus of claim 32, wherein said doctor means has a weight of at least 60 pounds.

35. Apparatus of claim 32, wherein said doctor means exerts a downward force between about 60 and about 200 pounds on the upper surface of said cavity pan.

36. Apparatus for filling bakery dough into a cavity pan, which is a pan having upper and lower surfaces and side edges, with cavities formed in the upper surface thereof for containment of bakery dough in said cavities, in preparation for baking of the same, comprising the following elements in combination:
1) conveyor means for conveying said cavity pan;
2) dough-feeding means for feeding dough to said cavity pan;
3) rotatable compaction means for forcing said dough into the cavities of said cavity pan;
4) doctor means for finalizing the level of said dough in said cavities and removing excess dough from said pan;
5) the direction of conveyance of said cavity pan being from said dough-feeding means to said compaction means to said doctor means;
6) and means for driving said conveyor means, said dough-feeding means, and said compaction means, wherein said rotatable compaction means exerts a downward force upon the upper surface of said cavity pan of at least about 100 pounds, and including means for imparting such downward force.

37. Apparatus of claim 36, wherein the rotatable compaction means rotates at a sufficient rate so that it rotates a plurality of times during the passage of a cavity pan thereunder.

38. Apparatus of claim 36, wherein said rotatable compaction means has a weight of at least 100 pounds.

39. Apparatus of claim 36, wherein said rotatable compaction means exerts a downward force upon the upper surface of said cavity pan of at least about 200 pounds.

40. Apparatus of claim 36, wherein the ratio of the rate of linear advancement of a cavity pan by said conveyor means to the rate of rotation of said rotatable compaction means when converted to a linear figure is between about 1:2.5 and about 1:7.5.

41. Apparatus of claim 40, wherein said ratio is at least about 1:4.

42. Apparatus of claim 41, wherein the ratio is about 1:5.

43. Apparatus of claim 36, wherein said conveyor means comprises endless conveyor belt or chain means and associated drive means.

44. Apparatus of claim 43, wherein said conveyor means comprises cleats and wherein said cavity pan comprises cooperating engaging means for engagement with said cleats.

45. Apparatus of claim 43, wherein said conveyor means comprises cleats adapted to engage cooperating portions of cavity pans to ensure conveyance of cavity pans in and through said apparatus.

46. Apparatus of claim 45, wherein said cleats are secured to said conveyor means and tapered so as to allow clearance of said cleats as they proceed on an endless course of travel of said conveyor means in said apparatus and around the drive means thereof.

47. Apparatus for filling bakery dough into a cavity pan, which is a pan having upper and lower surfaces and side edges, with cavities formed in the upper surface thereof for containment of bakery dough in said cavities, in preparation for baking of the same, comprising the following elements in combination:
 1) conveyor means for conveying said cavity pan;
 2) dough-feeding means for feeding dough to said cavity pan;
 3) rotatable compaction means for forcing said dough into the cavities of said cavity pan;
 4) doctor means for finalizing the level of said dough in said cavities and removing excess dough from said pan;
 5) the direction of conveyance of said cavity pan being from said dough-feeding means to said compaction means to said doctor means;
 6and means for driving said conveyor means, said dough-feeding means, and said compaction means, wherein said doctor means exerts a downward force upon the upper surface of said cavity pan of at least about 60 pounds, wherein said rotatable compaction means exerts a downward force upon the upper surface of said cavity pan of at least about 100 pounds, and wherein the rotatable compaction means rotates at a sufficient speed of rotation so as to provide a ration of the linear distance of travel of a point on the circumference thereof of at least 2.5:1 as compared with the linear distance of travel of the cavity pan on the conveyor during the same time period, and including means for imparting such downward forces and means for providing said ratio of linear distances.

48. Apparatus of claim 47, wherein the ratio of travel is between about 4:1 and 7.5:1.

49. Method of filling viscous bakery dough into a cavity pan, which is a pan having upper and lower surfaces and side edges with cavities formed in the upper surface thereof, for containment of bakery dough in said cavities, in preparation for baking of the same, comprising the following steps in combination:
 providing a source of viscous bakery dough to be filled into the cavities of said cavity pan;
 providing driven feeding means for drivingly feeding the bakery dough from said source to the cavities of said cavity pan;
 drivingly feeding said dough to said cavities by means of said driven feeding means;
 providing rotatable compaction means for forcing said viscous dough into the cavities of said cavity pan;
 forcing said viscous dough into said cavities by means of said rotatable compaction means;
 providing doctor means for finalizing the level of said viscous dough in said cavities and removing excess dough from said pan;
 finalizing the level of said dough in said cavities and removing excess by using said doctor means;
 providing conveyor means for conveying said cavity pan from one of said operations to the next;
 conveying said cavity pan from said feeding means to said compaction means to said doctor means for said successive operations by means of said conveyor means; and
 providing driving means for driving said conveyor means, said feeding means, and said rotatable compaction means.

50. Method of claim 49, wherein the cavity pan is heated prior to feeding the bakery dough into said cavities.

51. Method of claim 49, wherein said dough-feeding means is provided in the form of a rotatable feeding means.

52. Method of claim 49, wherein housing means is provided for restraining the dough within a volume defined by said housing means.

53. Method of filling bakery dough into a cavity pan, which is a pan having upper and lower surfaces and side edges with cavities formed in the upper surface thereof, for containment of bakery dough in said cavities, in preparation for baking of the same, comprising the following steps in combination:
 providing a source of bakery dough to be filled into the cavities of said cavity pan;
 providing feeding means for feeding the bakery dough from said source to the cavities of said cavity pan;
 feeding said dough to said cavities by means of said feeding means;
 providing rotatable compaction means for forcing said dough into the cavities of said cavity pan;
 forcing said dough into said cavities by means of said rotatable compaction means;
 providing doctor means for finalizing the level of said dough in said cavities and removing excess dough from said pan;
 finalizing the level of said dough in said cavities and removing excess by using said doctor means;
 providing conveyor means for conveying said cavity pan from one of said operations to the next;
 conveying said cavity pan from said feeding means to said compaction means to said doctor means for said successive operations by means of said conveyor means; and
 providing driving means for driving said conveyor means, said feeding means, and said rotatable compaction means,
 wherein said dough-feeding means is provided in the form of a double-drum feeding means, the drums of which rotate in opposite directions toward a central opening, thereby forcing the bakery dough toward said pan through said opening.

54. Method of claim 53, wherein said drums are provided in the form of drums having a surface of nylon.

55. Method of claim 53, wherein said drums are provided with grooved surfaces.

56. Method of filling bakery dough into a cavity pan, which is a pan having upper and lower surfaces and side edges with cavities formed in the upper surface thereof, for containment of bakery dough in said cavities, in preparation for baking of the same, comprising the following steps in combination:

providing a source of bakery dough to be filled into the cavities of said cavity pan;

providing feeding means for feeding the bakery dough from said source to the cavities of said cavity pan;

feeding said dough to said cavities by means of said feeding means;

providing rotatable compaction means for forcing said dough into the cavities of said cavity pan;

forcing said dough into said cavities by means of said rotatable compaction means;

providing doctor means for finalizing the level of said dough in said cavities and removing excess dough from said pan;

finalizing the level of said dough in said cavities and removing excess by using said doctor means;

providing conveyor means for conveying said cavity pan from one of said operations to the next;

conveying said cavity pan from said feeding means to said compaction means to said doctor means for said successive operations by means of said conveyor means; and providing driving means for driving said conveyor means, said feeding means, and said rotatable compaction means, wherein housing means is provided for restraining the dough within a volume defined by said housing means, and wherein a barrier plate is provided at an exit end of said housing means for preventing the dough from oozing forwardly out of said housing means.

57. Method of claim 56, wherein said barrier plate is made to cooperate with said doctor means to force dough into contact with said doctor means.

58. Method of claim 56, wherein the cavity pan is heated to a required baking temperature before feeding the bakery dough into the cavities of said cavity pan.

59. Method of claim 56, wherein the method is carried out intermittently, with at least two (2) pans being filled in each operation.

60. Method of claim 56, wherein said doctor means is provided with an arcuate surface and is maintained in contact with the upper surface of said cavity pan.

61. Method of claim 56, wherein said doctor means is provided in the form of a roll.

62. Method of claim 61, wherein said doctor means is provided in the form of a cylinder.

63. Method of claim 56, wherein restraining means is provided for restraining said dough to the upper surface area of one (1) or more cavity pans being filled therewith.

64. Method of claim 63, wherein one (1) or more side retainer rails are provided for preventing the dough from oozing outwardly.

65. Method of filling bakery dough into a cavity pan, which is a pan having upper and lower surfaces and side edges with cavities formed in the upper surface thereof, for containment of bakery dough in said cavities, in preparation for baking of the same, comprising the following steps in combination:

providing a source of bakery dough to be filled into the cavities of said cavity pan;

providing feeding means for feeding the bakery dough from said source to the cavities of said cavity pan;

feeding said dough to said cavities by means of said feeding means;

providing rotatable compaction means for forcing said dough into the cavities of said cavity pan;

forcing said dough into said cavities by means of said rotatable compaction means;

providing doctor means for finalizing the level of said dough in said cavities and removing excess dough from said pan;

finalizing the level of said dough in said cavities and removing excess by using said doctor means;

providing conveyor means for conveying said cavity pan from one of said operations to the next;

conveying said cavity pan from said feeding means to said compaction means to said doctor means for said successive operations by means of said conveyor means; and providing driving means for driving said conveyor means, said feeding means, and said rotatable compaction means, wherein said rotatable compaction means is in contact with the upper surface of said cavity pan, and wherein said rotatable compaction means is resiliently mounted so as to allow said compaction means to move upwardly if displaced but to return to said contact if displaced therefrom.

66. Method of claim 65, wherein said rotatable compaction means has an arcuate surface and is maintained in contact with the upper surface of said cavity pan.

67. Method of filling bakery dough into a cavity pan, which is a pan having upper and lower surfaces and side edges with cavities formed in the upper surface thereof, for containment of bakery dough in said cavities, in preparation for baking of the same, comprising the following steps in combination:

providing a source of bakery dough to be filled into the cavities of said cavity pan;

providing feeding means for feeding the bakery dough from said source to the cavities of said cavity pan;

feeding said dough to said cavities by means of said feeding means;

providing rotatable compaction means for forcing said dough into the cavities of said cavity pan;

forcing said dough into said cavities by means of said rotatable compaction means;

providing doctor means for finalizing the level of said dough in said cavities and removing excess dough from said pan;

finalizing the level of said dough in said cavities and removing excess by using said doctor means;

providing conveyor means for conveying said cavity pan from one of said operations to the next;

conveying said cavity pan from said feeding means to said compaction means to said doctor means for said successive operations by means of said conveyor means; and providing driving means for driving said conveyor means, said feeding means, and said rotatable compaction means, wherein said doctor means is provided in the form of a non-rotatable cylinder.

68. Method of filling bakery dough into a cavity pan, which is a pan having upper and lower surfaces and side edges with cavities formed in the upper surface thereof, for containment of bakery dough in said cavities, in preparation for baking of the same, comprising the following steps in combination:

providing a source of bakery dough to be filled into the cavities of said cavity pan;

providing feeding means for feeding the bakery dough from said source to the cavities of said cavity pan;

feeding said dough to said cavities by means of said feeding means;

providing rotatable compaction means for forcing said dough into the cavities of said cavity pan;

forcing said dough into said cavities by means of said rotatable compaction means;

providing doctor means for finalizing the level of said dough in said cavities and removing excess dough from said pan;

finalizing the level of said dough in said cavities and removing excess by using said doctor means;

providing conveyor means for conveying said cavity pan from one of said operations to the next;

conveying said cavity pan from said feeding means to said compaction means to said doctor means for said successive operations by means of said conveyor means; and providing driving means for driving said conveyor means, said feeding means, and said rotatable compaction means, wherein said doctor means is caused to exert a downward force upon the upper surface of said cavity pan of at least about 60 pounds.

69. Method of claim 68, wherein said doctor means is caused to exert a downward force between about 60 and about 200 pounds on the upper surface of said cavity pan.

70. Method of claim 69, wherein said doctor means has a weight of at least 60 pounds.

71. Method of claim 68, wherein said doctor means is mounted so as to allow said doctor to move upwardly displaced but to return to such contact if displaced therefrom.

72. Method of claim 71, wherein said doctor means is maintained in contact with the upper surface of said cavity pan.

73. Method of filling bakery dough into a cavity pan, which is a pan having upper and lower surfaces and side edges with cavities formed in the upper surface thereof, for containment of bakery dough in said cavities, in preparation for baking of the same, comprising the following steps in combination:

providing a source of bakery dough to be filled into the cavities of said cavity pan;

providing feeding means for feeding the bakery dough from said source to the cavities of said cavity pan;

feeding said dough to said cavities by means of said feeding means;

providing rotatable compaction means for forcing said dough into the cavities of said cavity pan;

forcing said dough into said cavities by means of said rotatable compaction means;

providing doctor means for finalizing the level of said dough in said cavities and removing excess dough from said pan;

finalizing the level of said dough in said cavities and removing excess by using said doctor means;

providing conveyor means for conveying said cavity pan from one of said operations to the next;

conveying said cavity pan from said feeding means to said compaction means to said doctor means for said successive operations by means of said conveyor means; and providing driving means for driving said conveyor means, said feeding means, and said rotatable compaction means, wherein said rotatable compaction means is caused to exert a downward force upon the upper surface of said cavity pan of at least about 100 pounds.

74. Method of claim 73, wherein said rotatable compaction means is caused to exert a downward force upon the upper surface of said cavity pan of at least about 200 pounds.

75. Method of claim 73, wherein the rate of linear advancement of a cavity pan by said conveyor means is maintained between about 1:2.5 and about 1:7.5 compared with the rate of rotation of said rotatable compaction means when converted to a distance figure.

76. Method of claim 73, wherein said rotatable compaction means is caused to rotate a predetermined distance at a predetermined rate compared with the rate of advancement of a cavity pan on said conveyor, said predetermined rate being at least about 4:1.

77. Method of claim 76, wherein the rate is about 5:1.

78. Method of claim 73, wherein the cavity pan employed comprises a sheet of solid aluminum or magnesium alloy, with openings drilled therein.

79. Method of claim 78, wherein the cavity pan is heated prior to feeding the bakery dough into said cavities.

80. Method of claim 73, wherein the cavity pan is heated to a required baking temperature before feeding the bakery dough into the cavities of said cavity pan.

81. Method of claim 73, wherein at least two (2) cavity pans are filled during each operation.

82. Method of claim 73, wherein the rotatable compaction means is caused to rotate at a sufficient speed of rotation so as to provide a ration of the linear distance of travel of a point on the circumference thereof at least 2.5:1 as compared with the linear distance of travel of a cavity pan on the conveyor during the same time period.

83. Method of claim 82, wherein the ratio of travel is between about 2.5:1 and 7.5:1.

84. Method of claim 73, wherein said rotatable compaction means has a weight of at least 100 pounds.

85. Method of claim 73, wherein the rotatable compaction means is caused to rotate at a sufficient rate so as to ensure that the rotatable compaction means rotates a plurality of times during the passage thereunder of a cavity pan.

86. Method of filling bakery dough into a cavity pan, which is a pan having upper and lower surfaces and side edges with cavities formed in the upper surface thereof, for containment of bakery dough in said cavities, in preparation for baking of the same, comprising the following steps in combination:

providing a source of bakery dough to be filled into the cavities of said cavity pan;

providing feeding means for feeding the bakery dough from said source to the cavities of said pan;

feeding said dough to said cavities by means of said feeding means;

providing rotatable compaction means for forcing said dough into the cavities of said cavity pan;

forcing said dough into said cavities by means of said rotatable compaction means;

providing doctor means for finalizing the level of said dough in said cavities and removing excess dough from said pan;
finalizing the level of said dough in said cavities and removing excess by using said doctor means;
providing conveyor means for conveying said cavity pan from one of said operations to the next;
conveying said cavity pan from said feeding means to said compaction means to said doctor means for said successive operations by means of said conveyor means; and
providing driving means for driving said conveyor means, said feeding means, and said rotatable compaction means, wherein said doctor means is caused to exert a downward force upon the upper surface of said cavity pan of at least about 60 pounds, wherein said rotatable compaction means is caused to exert a downward force upon the upper surface of said cavity pan of at least about 100 pounds, and wherein the rotatable compaction means is caused to rotate at a sufficient speed of rotation so as to provide a ratio of the linear distance of travel of a point on the circumference thereof of at least 2.5:1 as compared with the linear distance of travel of a cavity pan on the conveyor during the same time period.

87. Method of claim 86, wherein the ratio of travel is between about 4:1 and 7.5:1.

* * * * *

UNITED STATES PATENT AND TRADEMARK OFFICE
CERTIFICATE OF CORRECTION

PATENT NO. : 5,154,211
DATED : Oct. 13, 1992
INVENTOR(S) : George R. Daleiden, Billy D. Haffner It is certified that error appears in the above-identified patent and that said Letters Patent is hereby corrected as shown below:

Column 10, line 40; "tensionadjusting" should read
  -- tension-adjusting --.
Column 17, line 15; "18½ long," should read -- 18-½ long--
Column 25, line 37; "6and" should read -- 6) and --.

Column 25, approximately line 46; "ration" should read --ratio--.

Column 29, approximately line 39; "said doctor to" should read
  -- said doctor means to --.
Column 29, approximately line 39/40; "upwardly displaced" should read -- upwardly if displaced --.
Column 30, line 39; "ration" should read -- ratio --.

Signed and Sealed this

Second Day of November, 1993

BRUCE LEHMAN

Attest:

Attesting Officer

Commissioner of Patents and Trademarks